(12) United States Patent
Yamada et al.

(10) Patent No.: US 6,778,759 B1
(45) Date of Patent: Aug. 17, 2004

(54) INFORMATION RECORDING MEDIUM HAVING LOGICAL STRUCTURED RECORDING AREA

(75) Inventors: Ryuji Yamada, Ogaki (JP); Kenji Miyata, Inuyama (JP); Yoshihiko Horibe, Nagoya (JP); Sunao Kawai, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/536,039

(22) Filed: Mar. 27, 2000

(30) Foreign Application Priority Data

Mar. 31, 1999 (JP) .......................................... 11-093630

(51) Int. Cl.[7] .................................................. H04N 5/91
(52) U.S. Cl. ........................................ 386/95; 386/125
(58) Field of Search .............................. 386/1, 45, 95, 386/98, 125, 126; 369/14, 47.15, 272, 275.1, 275.3

(56) References Cited

U.S. PATENT DOCUMENTS

| | | | | |
|---|---|---|---|---|
| 6,442,333 B1 | * | 8/2002 | Izawa | 386/95 |
| 6,567,612 B2 | * | 5/2003 | Yoshio et al. | 386/125 |
| 6,622,276 B2 | * | 9/2003 | Nagasaki et al. | 369/14 |
| 6,636,474 B1 | * | 10/2003 | Tanaka et al. | 369/275.3 |
| 6,665,241 B2 | * | 12/2003 | Heo | 369/47.15 |

FOREIGN PATENT DOCUMENTS

| | | |
|---|---|---|
| JP | A 9-204759 | 8/1997 |
| JP | 10-108135 | 4/1998 |
| JP | 10-199215 | 7/1998 |
| JP | A 10-304304 | 11/1998 |
| JP | A 11-215466 | 8/1999 |
| JP | A 11-232792 | 8/1999 |

* cited by examiner

*Primary Examiner*—Thai Tran
*Assistant Examiner*—Christopher Onuaku
(74) *Attorney, Agent, or Firm*—Oliff & Berridge, PLC

(57) ABSTRACT

A method of making an information recording medium of the invention is that first a scenario template is generated based on an input scenario information and assignments of titles, chapters, programs, and cells are determined. Based on this assignments, a disk information file and video file management information are generated on a hard disk and a recording area of a video file data is allocated. At this time, in the disk information file and the video file management information, management information as to menu information corresponding to the scenario template and recording area of cells to be recorded in the video file data. Therefore, the efficiency of making a multimedia optical disc, such as a DVD, which records still picture data, moving picture data, or audio data such as voice, as a content, can be increased.

20 Claims, 24 Drawing Sheets

Fig.5

| DISK NUMBER | 1 |
|---|---|
| NUMBER OF CELLS | 10 |
| CELL NUMBER | 1 |
| CELL OFFSET | ADDRESS OF CELL 1 |
| CELL SIZE | 600,000,000 Byte |
| DISK NUMBER | 2 |
| CELL OFFSET | ADDRESS OF CELL 2 |
| CELL SIZE | 600,000,000 Byte |
| . . . | |
| ATTRIBUTE | GRADUATION ALBUM |

INFORMATION RECORDING MEDIUM HAVING LOGICAL STRUCTURED RECORDING AREA

BACKGROUND OF THE INVENTION

1. Field of Invention

The invention relates to a method and an apparatus for generating information for recording moving picture data, audio data, such as voice with the moving picture data or music, and sub-picture data, such as subtitles, on an information recording medium, such as a multimedia optical disc, on which is recordable the information as a system stream, and a method and an apparatus for making the information recording medium, and an information recording medium storing programs thereof.

2. Description of Related Art

A conventional recording method of a still picture, moving picture, or sound on a multimedia optical disc, such as a DVD (Digital Versatile Disc (or Disk)) is disclosed in Japanese Laid-Open Patent Application Publication No. 10-199215 and Japanese Laid-Open Patent Application Publication No. 10-108135. In this recording method, first, data of the still picture, moving picture, or sound for recording is encoded in digital based on a method specified in a standard such as MPEG (Motion Pictures Experts Group). Next, the encoded data is multiplexed according to a logical format specified in a standard of multimedia optical disc, such as the DVD, and a group of data, called a system stream, is generated. Then, system stream management information for managing the system stream is generated according to the logical format. Further, global management information for managing the entire disc, including the system stream management information, according to the logical format. Finally, the system stream, the system stream management information, and the global management information are recorded on the multimedia optical disc.

The multimedia optical disc, such as the DVD, can record an enormous amount of information, so that a plurality of video tapes, for example, which are shot at home, can be brought together in one multimedia optical disc using the above-described recording method. The multimedia optical disc can instantly detect a desirable playback portion by the management information even when an enormous amount of information is recorded thereon. Further, the multimedia optical disc has an outstanding advantage as the recording medium of video and audio.

However, according to the conventional recording method, the global management information, management information, and substantive data are recorded in an order specified by the logical format without any space therebetween, so that it is insufficient when making a change to the optical disc which has been already made once, because all information has to be generated again from the beginning.

Further, when source materials, such as VCR data, can not be prepared at once, the optical disc can not be made until all source materials, such as the VCR data, are prepared, because the optical disc can not record more data at a later time once the data is recorded thereon. Therefore, the optical disc can not be made efficiently.

SUMMARY OF THE INVENTION

The invention provides an information recording medium of a multimedia optical disc, such as a DVD, capable of increasing an efficiency of making the multimedia optical disc, such as the DVD, recording still picture data, moving picture data, or audio data, such as voice, as a content. The invention also provides a method and an apparatus for making the information recording medium, a method and apparatus for making an information recording medium using the method and the apparatus described above, and an information recording medium storing a program thereof for allowing a computer to execute these methods.

In order to achieve the above, an information recording medium of the invention may be a rewritable information recording medium having a logical structure to manage encoded substantive data representing one of video data or audio data per title, which allocates a recording area thereon for recording the substantive data and records substantive data management information for managing the recording area and the substantive data, and menu management information for managing the substantive data management information. A predetermined number of recording areas are allocated, each recording area has a predetermined size per cell, the menu management information contains information for managing the substantive data management information for a predetermined number of titles, the substantive data management information contains information for the predetermined number of titles, and the substantive data management information for each title contains information for managing the predetermined number of recording areas per cell.

The information recording medium is rewritable. On the information recording medium, the recording area of the encoded substantive data representing one of video data or audio data is allocated, and the substantive data management information for managing the substantive data and the recording area are recorded. Further, the menu management information for managing the substantive data management information is recorded thereon. As a result of recording these information, the recording area and the substantive data, which is recorded in the recording area, can be managed per title. The menu information contains the information for managing the predetermined number of the titles of the substantive data management information. The substantive data management information is contained the predetermined number of the titles. Further, the substantive data management information for each title contains the predetermined number of the information having the predetermined size for managing the recording area by the predetermined cell. Each recording area has the predetermined size per cell and is allocated the predetermined number. Therefore, when the size of the information is within the predetermined size, the additional substantive data is managed title by title based on the selection information even when the additional substantive data is recorded. Consequently, the trouble of generating the menu management information and the substantive data management information again from the beginning can be saved and the efficiency of making the information recording medium recorded the substantive data thereon can be increased.

According to another aspect of the invention, the menu management information and the substantive data management information are prerecorded selection information for selecting the title or the cell under the title thereon regardless of whether the substantive data is recorded in the recording area.

According to the information recording medium, the menu management information is prerecorded the information for selecting the title regardless of whether the substantive data is recorded in the recording area. Further, the substantive data management information is prerecorded the selection information for selecting the cell under the title regardless of whether the substantive data is recorded in the recording area. Therefore, even when the additional substantive data is recorded as described above, the substantive data is managed title by title based on the selection information. Consequently, the trouble of generating the menu management information and the substantive data management information again from the beginning can be saved and the efficiency of making the information recording medium recorded the substantive data thereon can be increased.

In a preferred aspect of the invention, a method for generating information to make the information recording medium by storing or allocating the each information and the recording areas on a storage device other than the information recording medium may include the steps of inputting scenario information for managing the substantive data management information per title and information of size and the number of the recording areas of the substantive data which is managed per cell; allocating a recording area for recording the number of the titles of information, which manages the substantive data, as a recording area of menu management information, on the storage device, based on the number of the titles included in structure information of the title in the scenario information; allocating a recording area for recording the number of the cells of information, which manages the recording areas of the substantive data, as a recording area of the substantive data management information, on the storage device, based on the number of the cells of the information included in the structure information of the title; allocating a recording area of the substantive data based on the size and the number of the substantive data and the number of the cells; recording the information for managing the substantive data management information in the recording area of the menu management information after allocating the recording area of the substantive data management information; and recording the information for managing the recording area of the substantive data in the recording area of the substantive data management information after allocating the recording area of the substantive data.

According to the information generating method for making the information recording medium, by storing or allocating the each information and the recording area on the storage device other than the information recording medium, the scenario information for managing the substantive data management information per title, the size and the number of the recording area of the substantive data managed by the cell are input when the information for making the information recording medium. Next, the recording area for recording the number of the titles of the information for managing the substantive data management information is allocated on the storage device as the recording area of the menu management information, based on the number of the titles included in the structure information of the title in the scenario information. Next, the recording area for recording the number of the cells of information, which manages the recording areas of the substantive data is allocated on the storage device as a recording area of the substantive data management information, based on the number of the cells of the information included in the structure information of the title. Next, the recording area of the substantive data is allocated based on the size and the number of the substantive data and the number of the cells. After allocating the recording area of the substantive data management information, the information for managing the substantive data management information is recorded in the recording area of the menu management information. Then, after allocating the recording area of the substantive data, the information for managing the recording area of the substantive data is recorded in the recording area of the substantive data management information. Therefore, an information recording condition that is the same as the information recording medium can be made on the storage device, so that additional information can be recorded regardless of the type of information.

According to another aspect of the invention, the information for managing the substantive data management information or the information for managing the recording area of the substantive data in the recording areas contains the selection information for selecting the title or the cell under the title. Therefore, even when additional substantive data is recorded as described above, the substantive data is managed title by title based on the selection information. Consequently, the trouble of generating the menu management information and the substantive data management information again from the beginning can be saved and the efficiency of making the information recording medium having recorded the substantive data thereon, can be increased.

In a preferred aspect of the invention, a method for making the information recording medium based on the each stored information by storing or allocating the information and the recording areas on the storage device other than the information recording medium may include the steps of outputting the information generated on the storage device by the information generating method; converting the output information to a predetermined recording format; and recording the information on the information recording medium by modulating a light beam based on the converted information.

According to this making method, by adding the substantive data in the recording area which is allocated by the aforementioned information generating method, an information recording condition that is the same as the information recording medium can be made on the storage device. Further, the information is recorded on the information recording medium by modulating the light beam based on the converted information, so that an additional information can be recorded regardless of the types of the information recording medium.

In a preferred aspect of the invention, a method for making an information recording medium recording video data or audio data thereon using the information recording medium may include the steps of preparing a plurality of kinds of information recording mediums having the logical structure, each kind of information recording medium being different in at least one of the number of the information, which any one of the number of the titles, the number of the cells per title, the number of hierarchies of the cell, and a pattern of the hierarchy; selecting one information recording medium having a logical structure which is suitable for a correlation among a plurality of the substantive data to be recorded from the various types of the information recording mediums; encoding the substantive data to be recorded; reading contents of the menu management information and substantive data management information from the selected information making medium; and recording the encoded substantive data in the recording area of the substantive data based on the read contents.

According to the making method, the information recording medium has the logical structure and the recording area which is allocated so as to be managed per title, and is prepared for the amount of information which any one of the number of the titles, the number of the cells per title, the number of hierarchies of the cell, and a pattern of the hierarchy, is different. Next, from the various types of the information recording medium, one information recording medium having a logical structure which is suitable for a correlation among a plurality of the substantive data to be recorded, is selected. Then, the substantive data to be recorded is encoded and the contents of the menu management information and substantive data management information are read from the selected information making medium. After that, the encoded substantive data is recorded in the recording area of the substantive data based on the read contents. Therefore, even when recording an author's VCR data, the management information does not need to be newly generated again, so that the information recording medium having the menu structure which is suitable for the VCR data can be efficiently made.

BRIEF DESCRIPTION OF THE DRAWINGS

A preferred embodiment of the invention will be described in detail with reference to the following figures wherein:

FIG. 5 is a diagram showing a scenario template information to be generated in the information generating apparatus of FIG. 1;

DETAILED DESCRIPTION OF PREFERRED EMBODIMENTS

Figure 1:
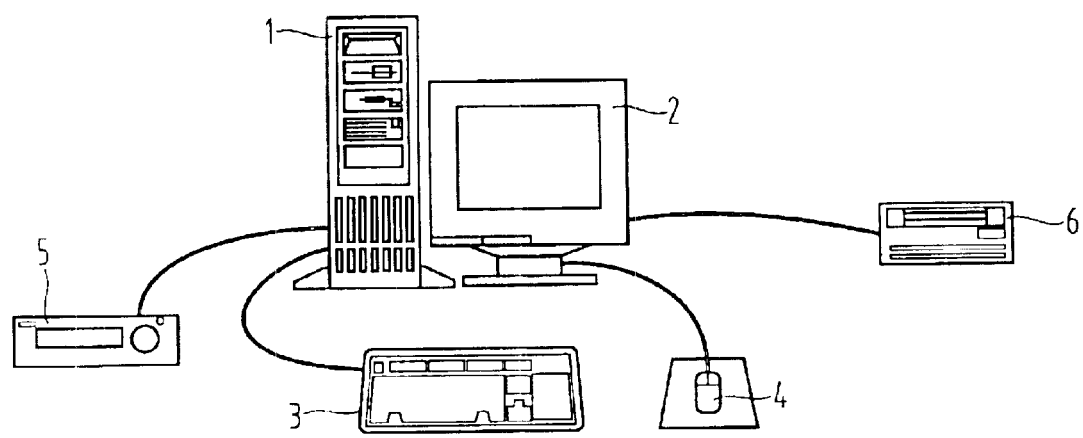
FIG. 1 is a front view of an information generating apparatus of a first embodiment of the invention.

Embodiments of the invention will be described with reference to the accompanying drawings.

First, a first embodiment of the invention will be described with reference to

FIGS. 1 to 8(B) and 21 to 26. In the embodiment, the invention is applied to a method and apparatus for making a multimedia optical disc such as a DVD (Digital Versatile Disc (or Disk)), on which menu information and management information corresponding to the menu information are recorded in advance and a recording area for substantive data, such as video data is allocated, and a method and apparatus for making a multimedia optical disc, on which video or audio data recorded on a video tape is recorded and which is capable of playing back the video or audio data, as content.

Hereinafter, each method and apparatus described above will be described. First, before describing the methods and apparatuses, a logical format for the multimedia optical disc, such as the DVD, will be described. In the description hereinafter, audiovisual data (hereinafter referred to as "AV data") generally includes both video and audio data. There are cases where only the video data exists and both video and audio data exist in the AV data.

First, a management unit of the content, such as a movie, recorded on the multimedia optical disc will be described. In the embodiment, the unit of content to be recorded on the multimedia optical disc is designated as a title. For example, when the content is a movie, one movie is assigned to one title. Therefore, a multimedia optical disc capable of recording three titles can record three movies.

A title set is constructed of a plurality of titles sharing the AV data each other. For example, when there are three versions, an uncut version, a theater version, and a TV version, that share a plurality of AV data with each other, for the same movie, they are collectively called one title set.

The multimedia optical disc of the embodiment can record a plurality of title sets. For example, when recording the theater version and the uncut version of movie A, movie B, and movie C, three title sets constructed of two titles, each are recorded on the multimedia optical disc.

Each title is constructed of scenes and playback route information of scenes. The scene includes the AV data, that is, the video and audio data. In this specification, the audio data not only includes human voice but also sound other than voice, or sound data, such as music, and the like.

The playback route information of scenes includes a playback route information having branches. In the embodiment, the playback route information having no branches for continuous playback is designated as a program chain (PGC) information. The PGC information are continuously sequenced and constructs the playback route information of the title set altogether.

Next, the logical format of the multimedia optical disc will be described. FIGS. 21 to 26 show only necessary information for embodying the invention, so that irrelevant portions are omitted from the illustrations.

Figure 21:
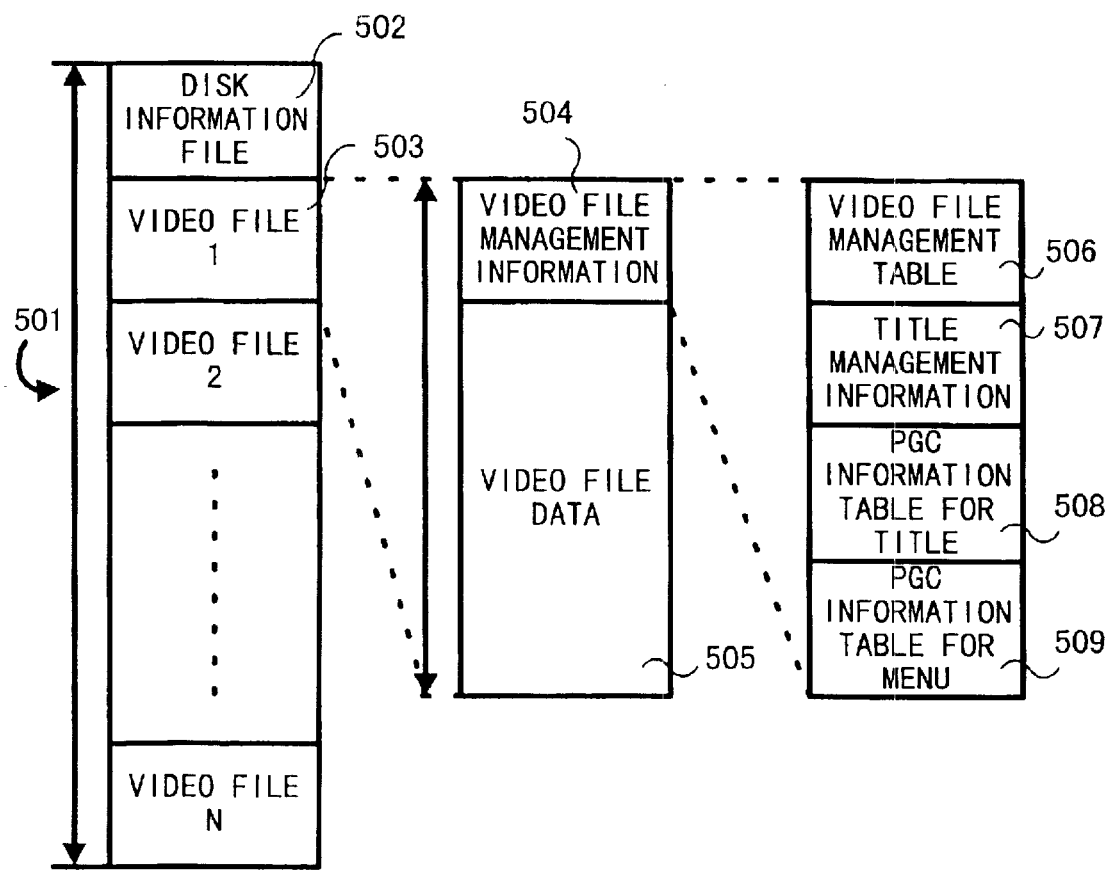
FIG. 21 is a logical format for a multimedia optical disc in the embodiments of the invention.

FIG. 21 shows a data structure of recording information to be recorded on the multimedia optical disc that is an information recording medium. Recording information 501 is constructed of a disk information file 502 and a plurality of video files 503. The disk information file 502 includes volume information that is global information of the multimedia optical disc. Further, the disk information file 502 includes menu management information for selecting a title set by a user when at the start of playing the multimedia optical disc.

The video file 503 includes individual title sets. The video file 503 is constructed of video file management information 504 that is substantive data management information, and video file data 505 that is the substantive data. The video file data 505 includes AV data of all scenes constructing the title set and sub-picture data. The video file management information 504 is constructed of a video file management table 506, tile management information 507, a PGC information table for title 508, and a PGC information table for menu 509. The video file management table 506 includes header information for the video file 503. The title management information 507 includes the information for managing a plurality of titles constructing the title set. The PGC information table for title 508 includes the information for defining all PGC information of titles in the title set. The PGC information table for menu 509 includes the information for defining all PGC information of the menu in the title set.

Figure 22:
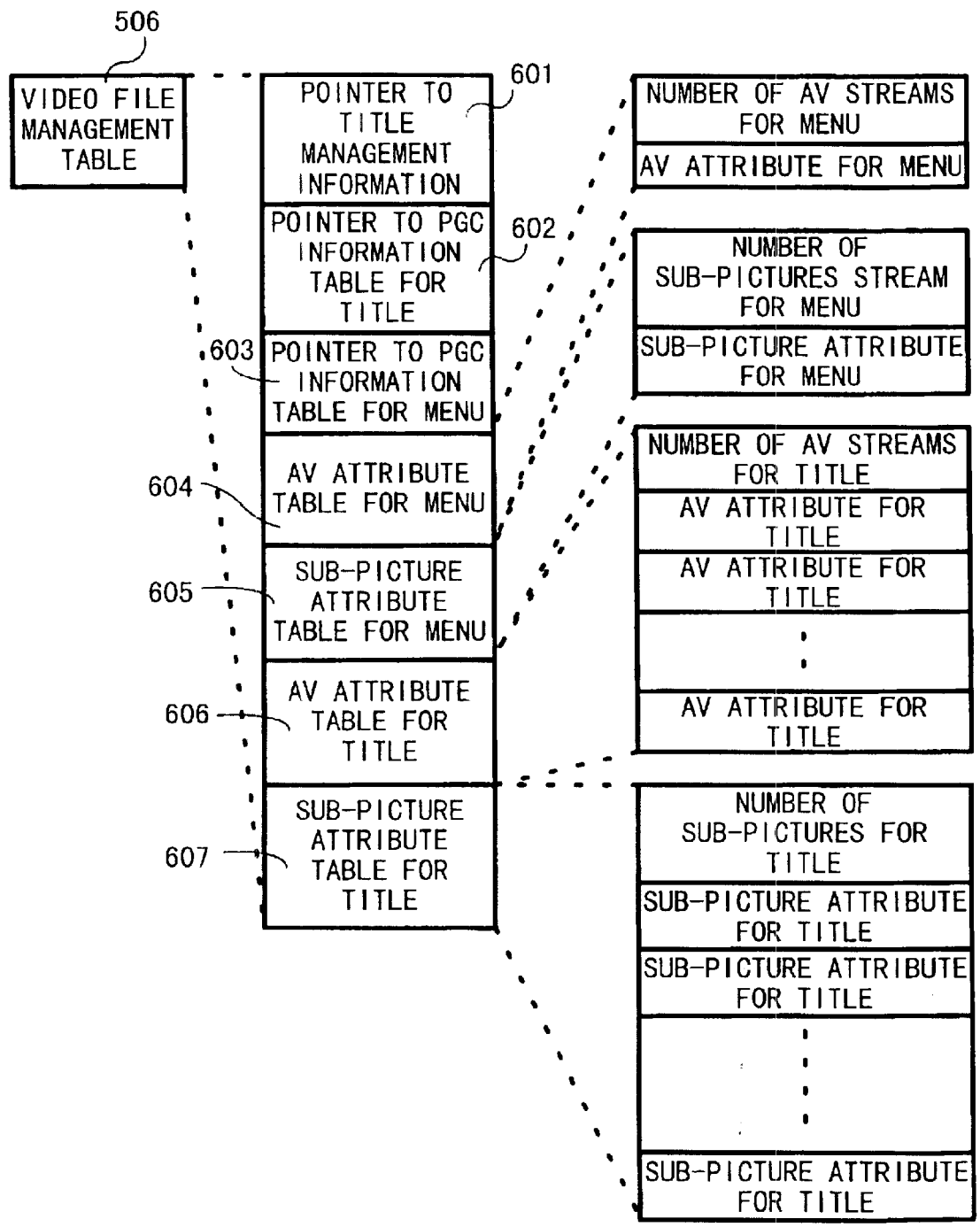
FIG. 22 is a diagram showing a video file management table of the logical format of FIG. 21 in detail.

FIG. 22 shows a structure of the video file management table 506. The video file management table 506 is constructed of a pointer 601 to the title management information 507, a pointer 602 to the PGC information table for title 508, a pointer 603 to the PGC information table for menu 509, an AV attribute table for menu 604, a sub-picture attribute table for menu 605, an AV attribute table for title 606, and a sub-picture table for title 607.

The AV attribute table for menu 604 includes a number of the video streams or audio streams to be used in the menu, and an attribute of the video or audio stream. The sub-picture attribute table for menu 605 includes a number of the sub-picture streams to be used in the menu and an attribute of the sub-picture stream. The AV attribute table for title 606 includes a number of the video streams or audio streams to be used in the title, and an attribute of the video or audio stream. The sub-picture attribute table for title 607 includes a number of the sub-picture streams to be used in the title and an attribute of the sub-picture stream.

Information about the number and the attribute of each stream can be set in advance before generating the video file data 505.

Figure 23:
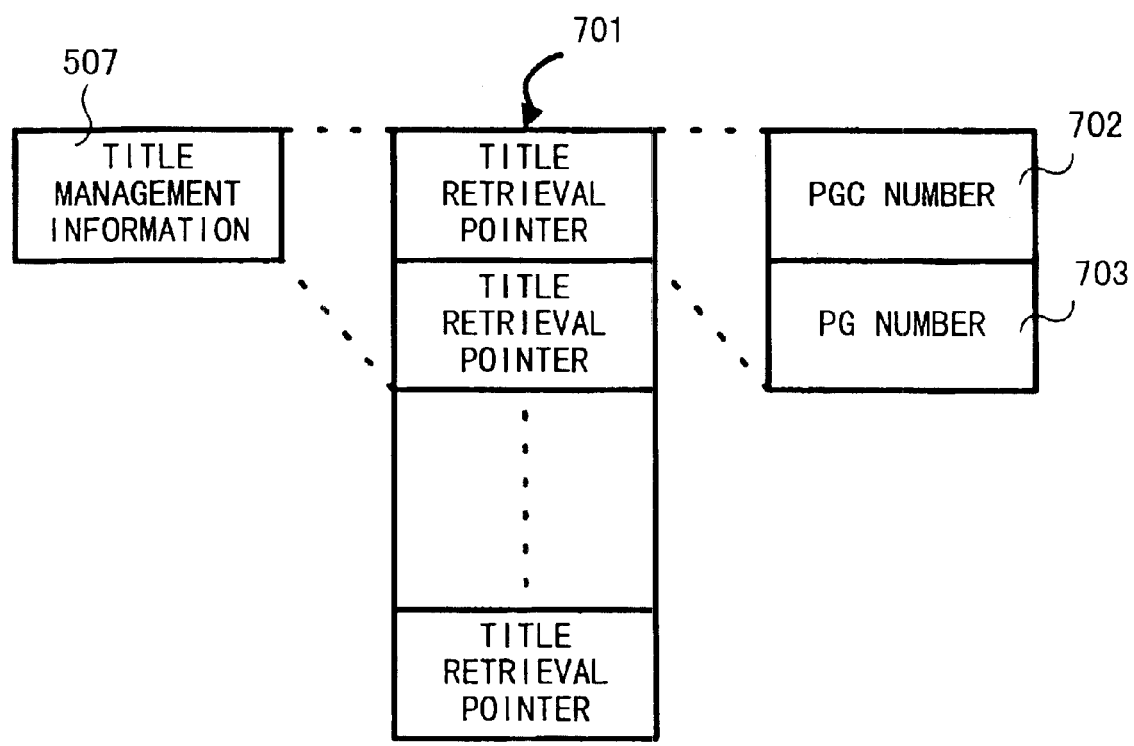
FIG. 23 is a diagram showing title management information of the logical format of FIG. 22 in detail.

FIG. 23 shows a structure of the title management information 507. The title management information 507 is a table of a title retrieval pointer 701 for speedily retrieving a title included in the video file data 505. The title retrieval pointer 701 includes a PCG number 702 that is a number of PGC information, and a program (PG) number 703 that is a number of the PG constructing the PGC.

A number of the title search pointers 701 is determined based on a number of the chapters. The number of the chapters can be set in advance before generating the video file data 505. Further, it is possible to set in advance which number of the PGC is assigned to which title or how many PGCs are assigned to each title. Furthermore, it is possible to set in advance which number of the PG is assigned to which chapter or how many PGs are assigned to each title.

Figure 24:
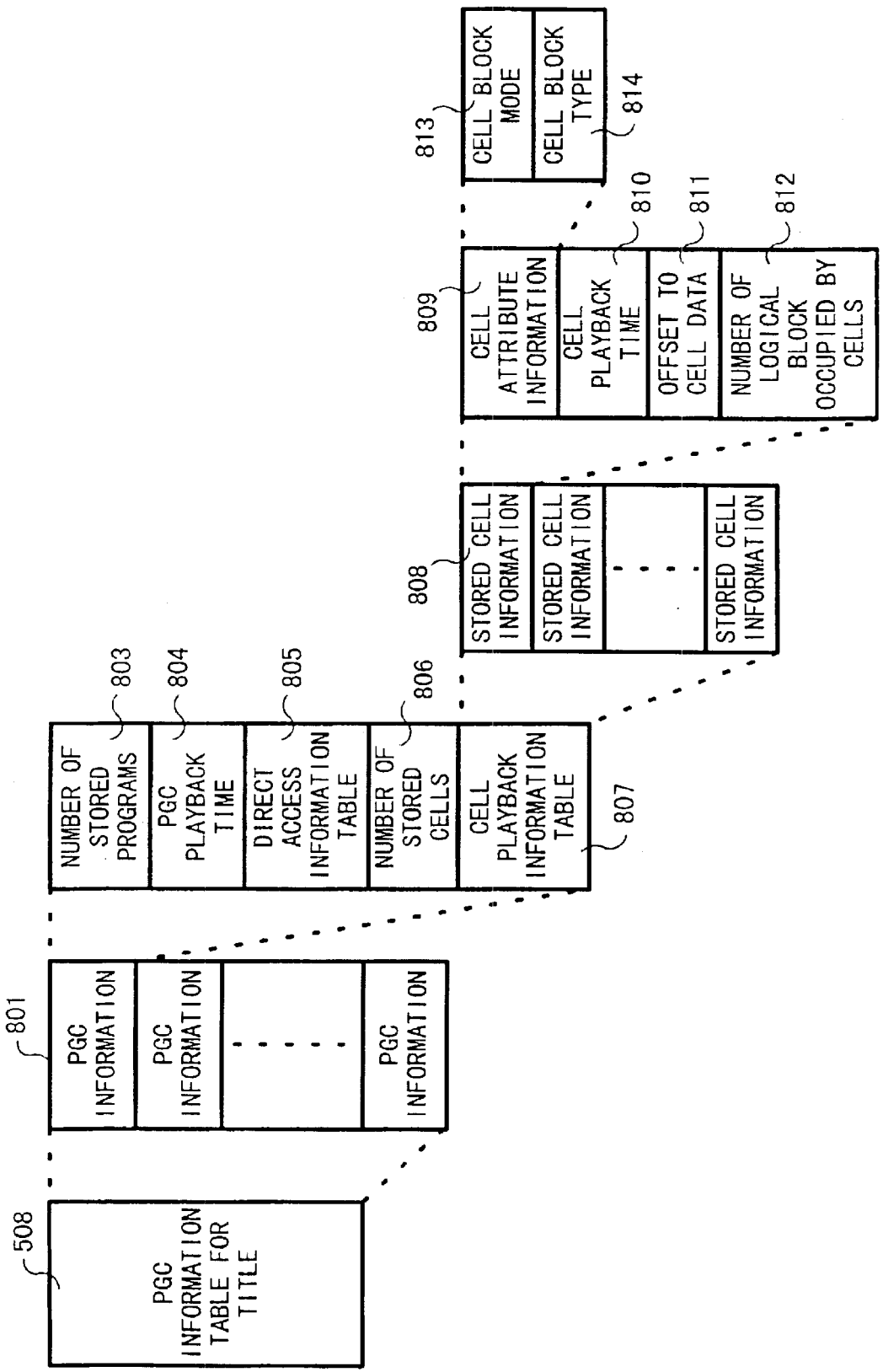
FIG. 24 is a diagram showing a program chain information table for title of the logical format of FIG. 21 in detail.

FIG. 24 shows a structure of data of the PGC information table for title 508. The PGC information table 508 is constructed of a plurality of entries each defining all PGC in the title set. Each PGC information 801 has a number of stored programs 803, a PCG playback time 804, a direct access information table 805, a number of the stored cells 806, and a cell playback information table 807.

The number of the stored programs 803 includes the information about the number of the programs managed by a piece of the PCG information 801. Further, the PCG playback time 804 includes the information about the time involved in playback of a piece of the PGC information 801. The direct access information table 805 includes a first cell number of the program. The number of the stored cells 806 includes the number of the programs of information about the number of the cells constructing one program. Encoding process, multiplexing process, and storing process are performed cell by cell which is an unit of these processes.

The cell playback information table 807 is constructed of one or more entries of the stored cell information 808. The number of the programs of the stored cell information 808 is provided. Further, the stored cell information 808 in the cell playback information table 807 are listed in the cell playback order.

Further, the stored cell information 808 includes cell attribute information 809, a cell playback time 810, an offset 811 showing a recording point of cell data to be stored in the video file data 505 on the optical disc, and a number of logical blocks 812, with respect to the cell that should be played back, with respect to each cell constructing the programs.

The cell attribute information 809 includes a cell block mode 813 and a cell block type 814. The cell block mode 813 includes the information about whether the cell constructs a multiangle block and if it constructs the multiangle block, whether the cell is the first or last one, or other. The cell block type 814 includes the information about whether the cell is in a multiangle block.

Figure 25:
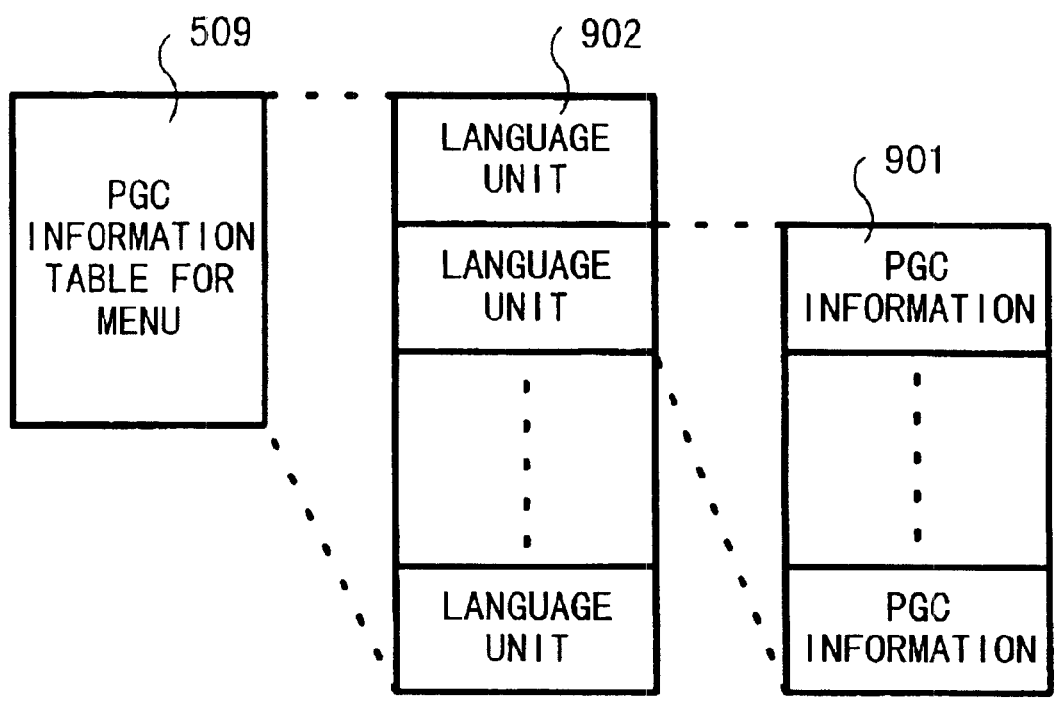
FIG. 25 is a diagram showing a program chain information table for menu of the logical format of FIG. 21 in detail.

FIG. 25 shows a structure of data of the PGC information table for menu. The multimedia optical disc often has a menu supporting a plurality of languages. Therefore, the PGC information 901 for each language are stored in the PGC information table for menu 509 as a menu language unit 902. The PGC information 901 is the same in structure as the PGC information for title 801 included in the PGC information table for title 508 shown in FIG. 24.

Figure 26:
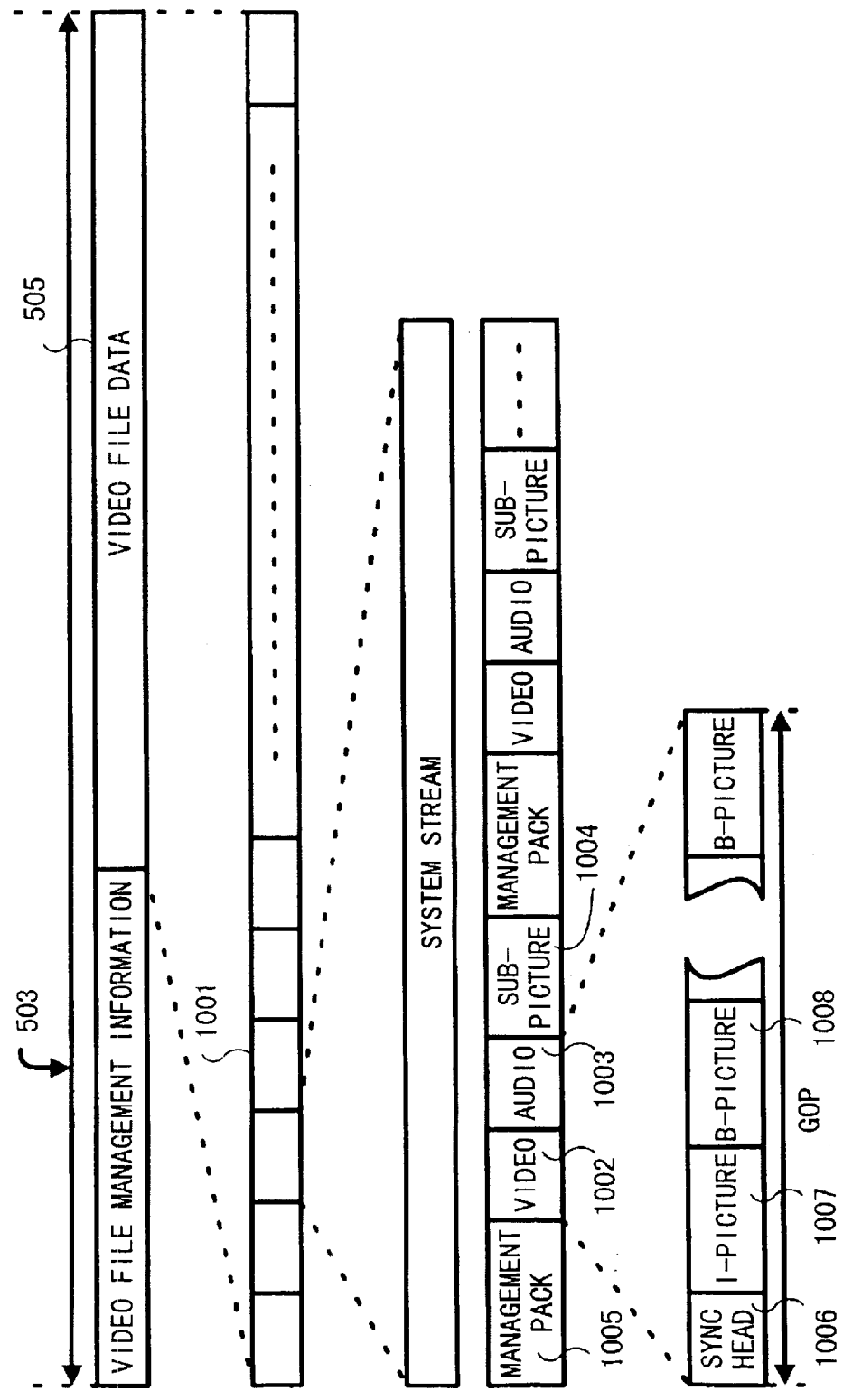
FIG. 26 is a diagram showing a video file data of the logical format of FIG. 21 in detail.

FIG. 26 shows a structure of the video file data 505. The video file data 505 is constructed of a plurality of system streams. The pack length of the system stream is 2KB, which is determined as a pack. Management information (management pack) 1005, moving picture information (video) 1002, audio information (audio) 1003, a sub-picture 1004 are repeatedly stored in the system stream in this order. The moving picture information 1005 consists of GOP (Group Of Pictures) that is a compression/decompression unit of moving picture data compression among frames. The GOP unit is a minimum picture unit, which can be independently played back. The management pack 1005 is interleaved as a management pack before the GOP. The management pack 1005 is search information for accessing GOP, and the information for menu information called high light information is also stored in the management pack 1005. The GOP of the moving picture information 1002 consists of 12 to 15 frame pictures and is constructed of a sync head 1006, an I-picture (Intra-coded picture) 1007, and a plurality of B-picture (Bidirectionally predictive-coded picture) 1008.

The logical format of the recording information 501 to be recorded on the multimedia optical disc, which is the object to be processed by the information generating apparatus of the embodiment.

Next, a general structure of information generating apparatus of the embodiment will be described with reference to FIGS. 1 and 2.

As shown in FIG. 1, the information generating apparatus of the embodiment comprises a main unit of the information generating apparatus 1 such as a personal computer, a display 2 such as CRT, a keyboard 3, a mouse 4, a video cassette recorder 5 (hereinafter referred to as VCR) for playing a video tape, and an optical disc recording apparatus 6, which is a recording device, for recording information on the multimedia optical disc such as the DVD.

Figure 2:
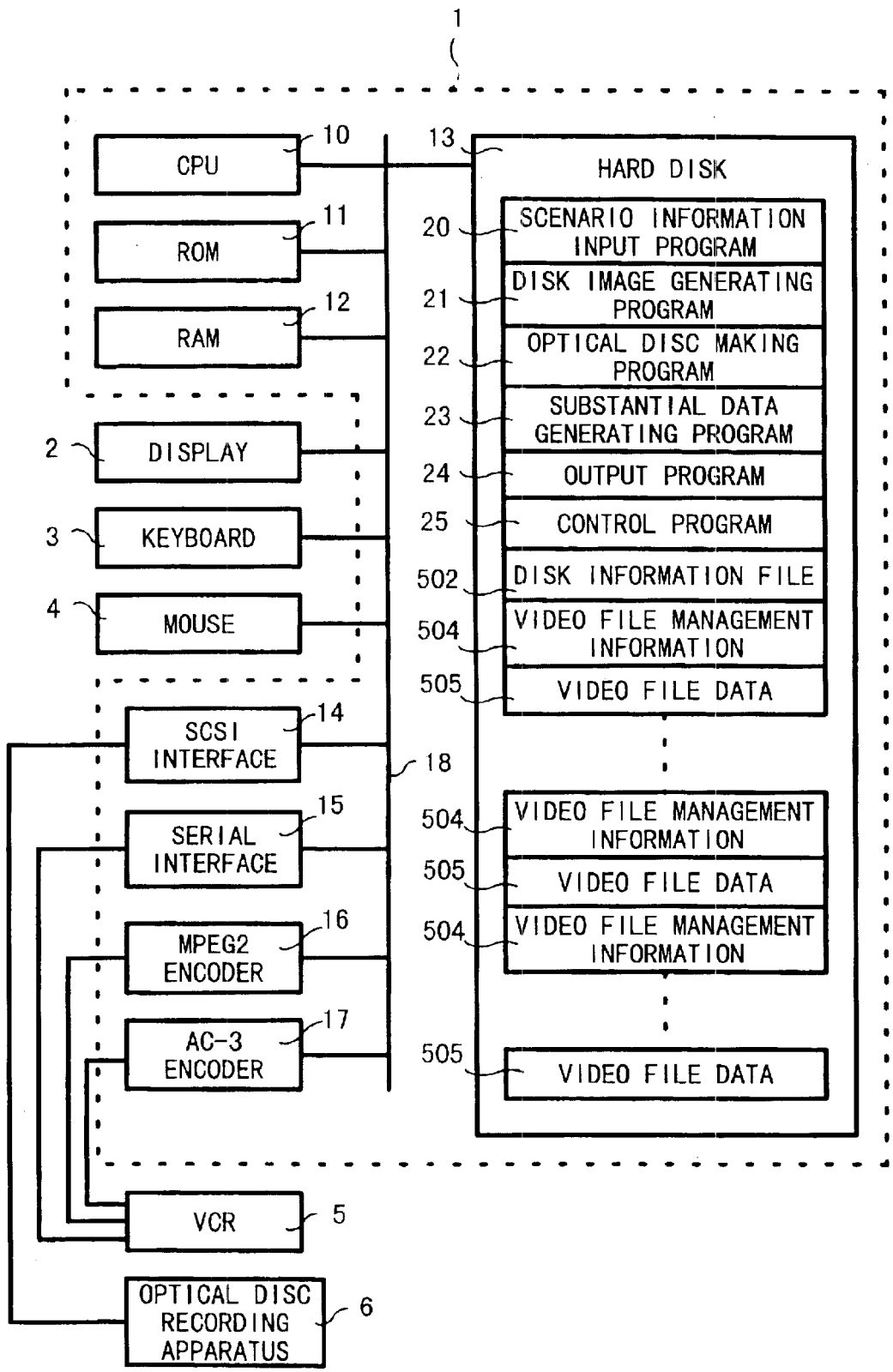
FIG. 2 is a block diagram showing a general structure of the information generating apparatus of FIG. 1.

As shown in FIG. 2, which is a block diagram showing the structure of the information generating apparatus of the embodiment, the main unit 1 comprises a CPU 10; a ROM 11, on which a BIOS program and other programs are stored; a RAM 12, which temporary stores data; a hard disk 13, which stores disk image data and various programs for implementing each above-described process in the information generating apparatus, as a storage device; SCSI interface 14, which is an interface to the optical disc recording apparatus 6; a serial interface 15, which is an interface to the VCR 5; an MPEG2 encoder 16 for encoding the AV data; and an AC-3 encoder 17 for encoding the audio data. In FIG. 2, aforementioned elements of the main unit 1 are enclosed with a dashed line. Each elements described above, the display 2, the keyboard 3, and the mouse 4 are connected each other via a bus 18.

The main unit 1 comprises a general computer equipment, such as the aforementioned personal computer. However, in FIG. 2, of elements of general computer equipment, the elements, for which explanations are unnecessary for the embodiment, are omitted from the illustration.

For example, there is a floppy disk drive or a CD-ROM drive other than the elements shown in FIG. 2. Programs for each process in the information generating apparatus of the embodiment are stored on such as the CD-ROM, which is an information recording medium. The programs can become a state in which it can run by installing the programs on the hard disk 13 using the CD-ROM drive. In FIG. 2, it has been shown that a scenario information input program 20, a disk image generating program 21, an optical disc making program 22, a substantive data generating program 23, an output program 24, and a control program 25 are installed on the hard disk 13.

The hard disk 13 is used as a storage device for storing information to be recorded on the multimedia optical disc such as the DVD. In FIG. 2, it has been shown that a disk information file 502, video file management information 504, and video file data 505 are stored on the hard disk 13.

Detailed explanations about the CPU 10, the ROM 11, the RAM 12, the display 2, the keyboard 3, and the mouse 4 are omitted since they are similar in structure to those used for the general computer equipment.

In the main unit 1 of the embodiment, there are an MPEG2 encoder 16 and an AC-3 encoder 17, which the general computer equipment does not comprise thereon.

The MPEG2 encoder 16 is a device for compressing and encoding video data according to the MPEG2 standard. The AC-3 encoder 17 is a device for compressing and encoding audio data according to the AC-3 standard. These encoders are equipped as add-on boards which can be attached to the bus 18 in the main unit 1. These encoders each have a video interface for connecting with the VCR 5, and an audio interface for connecting with the optical disc recording apparatus 6.

FIG. 1 shows an example that one VCR 5 is connected to the main unit 1. However, it would be understood that the invention is not restricted to the particular forms shown in the embodiment. A plurality of VCRs 5 can be connected to the main unit 1. A selection of VCR 5, access to a specific point of a video tape in the selected VCR 5, or playing and stopping the video tape is implemented by outputting control signals to the VCR 5 via the serial interface 15. The control signals are output by the execution of a control program installed on the hard disk 13, by the CPU 10.

For example, the optical disc recording apparatus 6 that records data on a DVD-RW (DVD-Rewritable) or DVD-RAM that can be rewritten thousands of times, is used. That is, in the embodiment, the DVD-RW is used as the multimedia optical disc. However, it would be understood that the invention is not restricted to the particular forms shown in the embodiment. For example, data may be temporary recorded on a digital linear tape using a digital tape recording apparatus instead of the optical disc recording apparatus 6. Then, the data may be transferred to and recorded on the multimedia optical disc by undergoing a pressing operation or the like using the digital linear tape.

Next, a process of making an information recording medium using the information generating apparatus of the embodiment will be described with reference to FIGS. 3 to 9.

A scenario information is the information for instructing a structure of the contents to be recorded on the multimedia optical disc. The scenario information is input by a scenario information input device in the information generating apparatus of the embodiment. The scenario information input device functions by the execution of a scenario information input program 20 installed on the hard disk 13, by the CPU 10. First, the CPU 10 runs the scenario information input program 20 so that an entry form is displayed on the display 2. When an operator inputs the necessary information to the entry form using the keyboard 3 or the mouse 4, the CPU 10 reads the input information and stores them in the RAM 12 or the hard disk 13, and then generates scenario information 400 as shown in FIG. 3.

Figure 3:
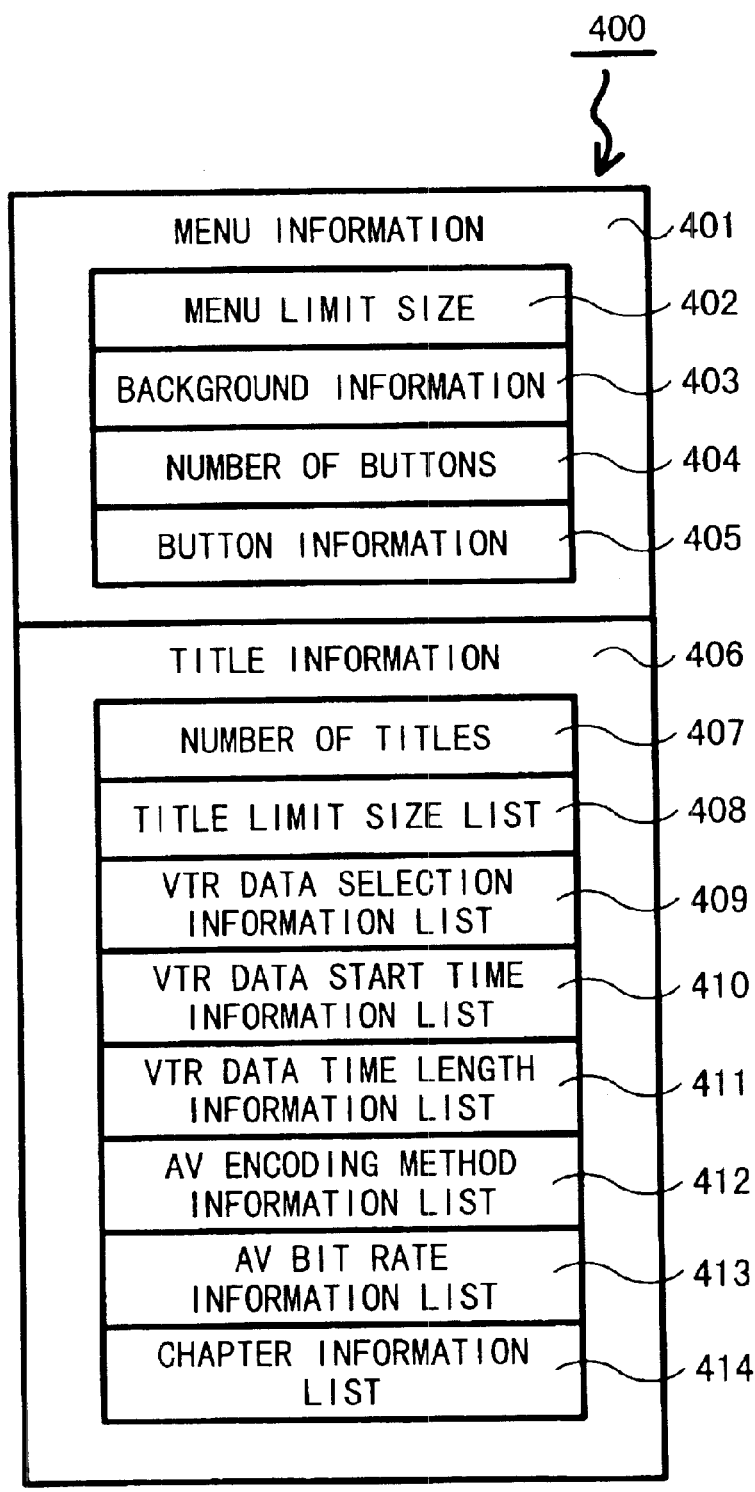
FIG. 3 is a diagram showing a structure of scenario information to be generated in the information generating apparatus of FIG. 1.

FIG. 3 is a schematic diagram showing a part of the scenario information 400, including menu information 401 and title information 406 that is structure information of title. Other information included in the scenario information 400 is a type of the multimedia optical disc, information about authors of the contents to be recorded, or the like. However, detailed explanations for these information are omitted since it is unnecessary for the embodiment.

The menu information 401 includes limit size information for menu 402, background information 403, information of a number of the buttons 404, and button information 405. The menu information 401 is the information about a menu displayed on a screen of such as a television at a time of playing the multimedia optical disc such as the DVD. A desirable title or the like can be played back by the title or the like being specified by a user according to the menu.

The limit size information for menu 402 includes the information about an upper limit of amount of storage available for data constructing the above-described menu in the recording capacity of the multimedia optical disc. The video and audio data of the title are stored as the video file data 505 as shown in FIG. 21, and are managed by the video file management information 504. The menu also has the similar structure. That is, the video and audio data of the menu are stored as the video file data for menu 505, and are managed by the video file management information for menu 504. Therefore, to construct the menu, areas for recording the video file management information for menu 504 and the video file data for menu 505 is needed. Thus, in the entry form in which the scenario information is entered by the operator of the optical disc, a field in which the upper limit of the size to be allocated to these recording areas is entered is provided, and the CPU 10 generates the limit size information for menu 402 based on the entered information.

The background information 403 includes the information of an image to be displayed as a background at the time of displaying buttons. That is, the menu to be displayed on the television or the like is structured such that the buttons with the titles or the like are displayed against the image to be the background. The image to be the background is generated in advance using a tool for making the menu or the like. Then, information for specifying the image to be the background is entered as the scenario information, and then the CPU 10 generates the background information 403 based on the entered information.

The information of the number of the buttons 404 includes the information about the number of the buttons to be displayed as the menu. In the video file data for menu 505, the number of the buttons of display data of buttons are stored. The video file management information for menu 504 needs to manage the number of the buttons of the display data of the video file data for menu 505, so that the information of the number of the buttons 404 is used for generating the video file management information for menu 504 and the video file data for menu 505. Thus, the information of the number of the buttons is entered as the scenario information, and the CPU 10 generates the information of the number of the buttons 404 based on the entered information.

The button information 405 includes display information of the buttons on a screen and information about a playback control of such as specifying an operation to be implemented by selecting buttons. For example, the menu management information, which brings the button into correspondence with the PGC information for title 801, is included in the information about the playback control. In the menu management information, for example, a number of the PGC information 801 corresponding to the button is stored as a selected information of the PGC information 801. Then, these information are entered as the scenario information, and the CPU 10 generates the button information 403 based on the entered information.

The title information 406 includes information of a number of titles 407, a limit size information list for title 408, a VCR data selection information list 409, a VCR data start time information list 410, a VCR data time length information list 411, an AV encoding method information list 412, an AV bit rate list 413, and a chapter information list 414. The AV includes both the video and the audio, so that the AV encoding method includes the encoding method of either video or audio, or both.

The information of the number of the titles 407 includes the number of the titles, that is, the number of continuous playback AV data to be recorded on the multimedia optical disc. The number of the titles can be at liberty to set by an operator. The number is entered as the scenario information, and the CPU 10 generates the information of the number of the title 407 based on the entered information.

The limit size information list for title 408, which includes maximum size information of the substantive data, includes an upper limit of amount of storage available for data constructing each title in the recording capacity of the multimedia optical disc. That is, a group of source materials of the video or audio data for constructing one title shown in FIG. 21 is stored in the area in the video file data 505, and the information for managing the video file data 505 is recorded in the area in the video file management information 504, so that the areas for recording the video file management information 504 and video file data 505 are needed for constructing the title. Therefore, in the entry form, the field in which the upper limit of the size to be allocated to the recording area is provided. The CPU 10 generates the limit size information list for size 408 based on the entered information. In the embodiment, for example, one optical disc is constructed of one title, the title is constructed of one PGC information 801, and one program is constructed of one cell. Therefore, the upper limit of the size of the video file data 505 is calculated by entering the total number of cells in an optical disc and the size to be allocated to the recording area for each cell, in the entry form.

However, it would be understood that the invention is not restricted to the particular forms shown in aforementioned embodiment. A plurality of the titles may be recorded on one optical disc. In FIG. 3, it is for reason that the limit size information list for title is named as so, instead of limit size information for title. When a plurality of the titles to be recorded on one optical disc, the limit size information for title can be set title-by-title.

The VCR data selection information list 409 is the information about the playback AV data of the title and includes the information for specifying an AV source in which video and audio to be encoded are recorded. For example, when the AV sources are stored in a plurality of videotapes, an identification number is given to each videotape so that it becomes possible to specify the AV source by the identification number. Therefore, the identification number is entered as the scenario information, and the CPU 10 generates the VCR data selection information 409 based on the entered information. The VCR data selection information are listed title-by-title. However, the VCR data selection information is found at the time of recording the AV data on the optical disc actually. Therefore, when an optical disc is made from scratch, the VCR data selection information is not entered as the embodiment.

The VCR data start time information list 410 and the VCR data time length list 411 are the information for specifying the encoding of the randomly chosen point of the AV source. For example, when the point where ten minutes advanced from the beginning of the videotape specified by the identification information is determined as a starting point and the point where thirty minutes advanced from the beginning of the videotape is determined as an ending point, the information ten minutes is entered in the start time information and the information twenty minutes is entered in the time length information. As the scenario information, the time of the starting point and the time length are entered, and the CPU 10 generates the VCR data start time information list 410 and the VCR data time length list 411 based on the entered information. The VCR data start time information are listed title-by-title. The start time information and the time length information are also found at the time of recording the AV data on the optical disc actually. Therefore, when an optical disc is made from scratch, the these information are not entered as the embodiment.

The AV encoding method information list 412 that is encoding information is the information for specifying the AV encoding method. For example, the encoding method information for the video includes an aspect ratio, a frame rate, or the like. The encoding method for the audio includes a sampling frequency, or the like. These information can be at liberty to set by the operator. These information are entered as the scenario information, and the CPU 10 generates the AV encoding method information list based on the entered information. The AV encoding method information is also listed title-by-title.

The AV bit rate list 413 that is other encoding information is the information for specifying the bit rate at a time of encoding the AV according to the MPEG2 or the AC-3 standard. This information can be at liberty to set by the operator. This information is entered as the scenario information, and the CPU 10 generates the AV bit rate list 413 based on the entered information. The AV bit rate information is also listed title-by-title.

The chapter information list 414 is the information for dividing the title into arbitrary playback sections so that they are dealt as chapters and includes a time information of the dividing points. This information can be at liberty to set by the operator. The time information of the dividing points is entered as the scenario information, and the CPU 10 generates the chapter information list 414 based on the entered information. The chapter information is also listed title-by-title.

Figure 4:
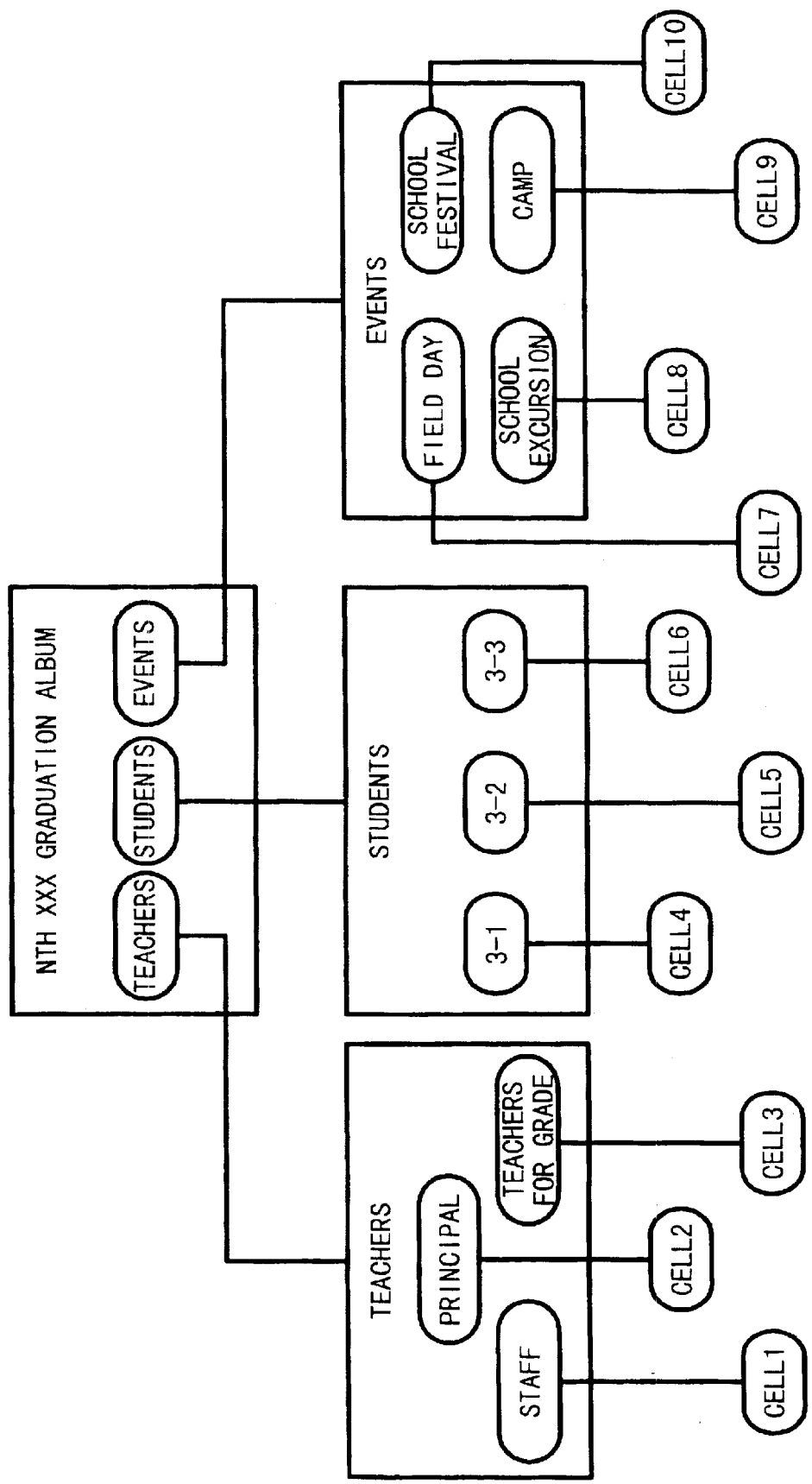
FIG. 4 is a diagram showing a scenario template to be generated in the information generating apparatus of FIG. 1.

As the scenario information 400 constructed of the aforementioned menu information 401 and title information 406 is generated using the tool for making the menu, for example, a scenario template as shown in FIG. 4 is displayed on the display 2 in the information generating apparatus. In the example shown in FIG. 4, the title named as "Nth XXX Graduation Album" is constructed of three chapters named as "Teachers", "Students", and "Events". The chapter named as "Teacher" is constructed of programs named as "Staff", "Principal", and "Teachers for the Grade" and a cell 1, a cell 2, and a cell 3 are assigned to each program, respectively. Further, the chapter named as "Students" is constructed of programs named as "3-1", "3-2", "3-3" and a cell 4, a cell 5, and a cell 6 are assigned to each programs, respectively. Furthermore, the chapter named as "Events" is constructed of programs named as "Field Day", "School Excursion", "School Festival", and "Camp" and a cell 7, a cell 8, a cell 9, and a cell 10 are assigned each programs, respectively.

The operator can make the menu structure in an interactive manner while confirming the menu structure displayed on the display 2. In the FIG. 4, oval-shaped portions with chapter or program names corresponds to the buttons and areas around the buttons enclosed with rectangles corresponds to the background images described above. When the scenario template as shown in FIG. 4 is displayed, the buttons and the background images that are used in a completed optical disc may be displayed. However, it would be understood that the invention is not restricted to the particular forms shown in the embodiment. When the scenario template is displayed, unsophisticated frames where the buttons and the background image are supposed to be displayed may be displayed instead of the actual images.

Further, in the embodiment, at a time of generating such a scenario template, scenario template information as shown in FIG. 5 is generated and is stored in the RAM 12 or the hard disk 13. As shown in FIG. 5, the scenario template information is constructed of information of a disk number, the number of the cells, a cell number, the cell offset, the cell size, and the attribute. The most of the information for generating the limit size list of title 408 can be used for these information. The disk number and the attribute are entered by the operator using the entry form or the like. However, the cell offset is found after a disk image generating process, so that it is recorded after the disk image generating process is completed.

Next, the disk image generating process for reproducing the information to be recorded on the optical disc on the hard disk 13 using the aforementioned scenario template will be described. The disk image is generated by a recording area allocating device and an information recording device. The recording are allocating device and the information recording device functions by an execution of the disk image generating program installed on the hard disk 13, by the CPU 10.

First, the CPU 10 generates the disk information file 502 based on the scenario template. As shown in FIG. 21, the disk information file 502 forms the recording information 501 of the optical disc with the video file 503, and includes the information of the whole optical disc, such as the volume information, the total number of the titles, the total number of the chapters, the type of the optical disc, the author of the recorded information, and a country code. Further, the disk information file 502 also includes the menu information 401.

The CPU 10 reads the information of the number of the titles 407 and the chapter information list 414 included in the title information 406 of the scenario information 400 stored in the RAM 12 or the hard disk 13, and stores the structure of the playback AV data that is the whole optical disc, as data. For example, the CPU 10 stores the disk information file 502 including the total number of the titles and the chapters on the hard disk 13, as the data.

Next, the CPU 10 reads the background information 403, the information of the number of the buttons 404, the button information 405 included in the menu information 401 of the scenario information 400 stored in the RAM 12 or the hard disk 13. Then, while the CPU 10 reads the image specified by the background information 403 from the hard disk 13, the CPU 10 reads the display information included in the button information 405, and superimposes the display information of the button image over the image specified by the background information 403. Further, the menu data is structured so that any point in any title can be played back at the flick of the button, by corresponding the button with the title from the information about the playback control of the button information 405. Then, the superimposed background information and display information of the buttons and the menu data are stored on the hard disk 13, as the disk information file 502.

The video file management information 504 is the information for managing the video file data 505, and as shown in FIG. 21, the video file data 503 is constructed of these information. As described above, the video file management information 504 includes the information of such as the size or the recording point of the cell to be stored in the video file 503. In the embodiment, as described above, the total number of the cells is found from the scenario template shown in FIG. 5, so that the CPU 10 generates the PGC information table for title 508 except for the direct access information table 805, the cell playback time 810, the offset 811 to the cell data, and the logical block 812 occupied by the cell. Further, the CPU 10 generates the video file management information 504 by generating the video file management table 506, the title management information 507, and the PGC information table for menu 509.

Then, the CPU 10 stores the video file management information 504 next to the disk information file 502 formed on the hard disk 13.

As described above, the video file data 505 is constructed of the cells and is generated by encoding and multiplexing the moving picture information (video) 1002, the audio information (audio) 1003. However, in the embodiment, first, the optical disc that is not recorded the moving picture information 1002 and the audio information 1003 is to be made, so that only the allocating process of the recording area for the video file data 505 is performed at this stage.

More specifically, as described above, since the total number and size of the cells are found from the scenario template information shown in FIG. 5, the number of the size of the cells of the recording area is allocated next to the recording area of the video file management information 504 of the hard disk 13, in the order of the cell number. Therefore, the offset of each cell is found, so that the CPU 10 writes the found value of the offset in the area of the offset 811 in the PGC information table for title shown in FIG. 24. At the same time, the CPU 10 stores the value of the offset in the scenario template information shown in FIG. 5.

Figure 6:
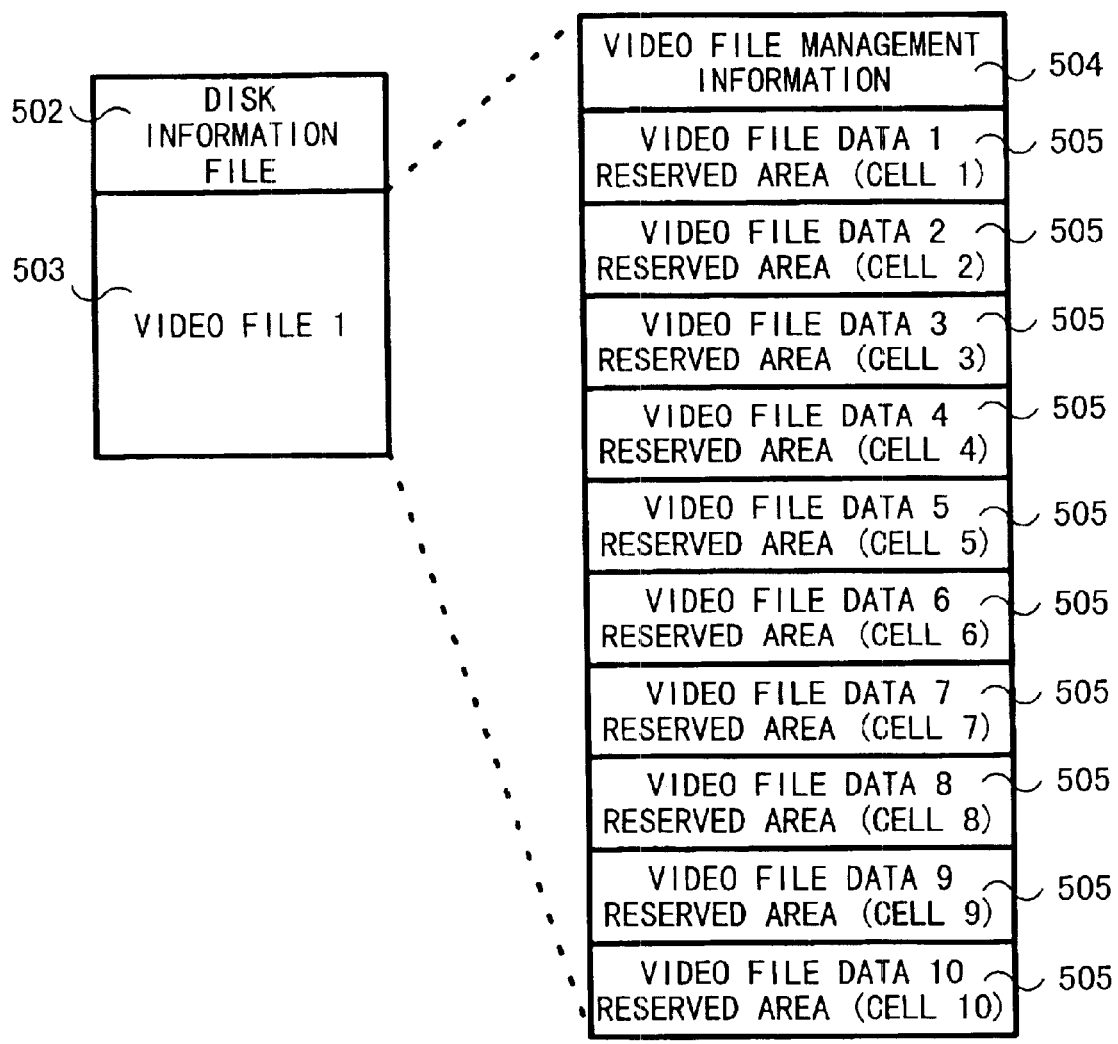
FIG. 6 is a diagram showing a structure of information to be generated on a hard disk in the information generating apparatus of FIG. 1.

By performing the aforementioned process, the disk image according to the logical format of the optical disc is generated on the hard disk 13 as shown in FIG. 6. The disk image of FIG. 6 is corresponded to the scenario template shown in FIG. 4. As shown in FIG. 6, the actual AV data has not been recorded in the recording area of each video file data in the disk image yet at this stage. The recording area is in a state that the AV data can be recorded thereon, as a reserve area.

Finally, the disk image generated by the aforementioned method is output to the optical disc recording apparatus 6 that is a recording device, and a process for recording the disk image on the optical disc by the optical disc recording apparatus 6 is performed. The output process is performed by an information output device in the information generating apparatus of the embodiment. The information output device is implemented by the execution of an optical disc making program installed in the hard disk 13 shown in FIG. 2, by the CPU 10. The CPU 10 outputs the disk image generated on the hard disk 13 to the optical disc recording apparatus 6 via the SCSI interface 14, allows the optical disc recording apparatus 6 to write the data into the multimedia optical disc 520, and brings the multimedia optical disc 520 into perfection. The optical disc recording apparatus 6 is provided with a conversion device that converts the data according to the optical disc standard such as a modulation, an interleave, or the like. The optical disc recording apparatus 6 modulates a light beam and records the information on the optical disc while converting the disk image.

Data may be temporary recorded on a different recording medium from the multimedia optical disc, such as the digital linear tape, using the digital tape recording apparatus (not shown). Then, the data may be transferred to and recorded on the multimedia optical disc, such as the DVD, by undergoing a pressing operation or the like using the digital linear tape.

As described above, the optical disc that has the management information according to the scenario template shown in FIG. 4 and on which the AV data is not recorded is made. In the embodiment, various types of optical discs that the AV data is not recorded thereon are made in advance. For example, as shown in FIG. 4, for the scenario template corresponding to the graduation album, a different disc such that "Club Activities" is added as the chapter and "Music Festival" is added in the "Events" chapter as the program is made as a disk number 2. Further, for the same graduation albums, optical discs corresponding to an elementary school, a junior high school, a high school, or an university are prepared. Furthermore, an optical disc which attribute is different from the graduation album is made. For each optical disc, the scenario template information shown in FIG. 5 is also made.

When a command for recording a source material of VCR data on an optical disc is issued by an author of the contents, the operator determines an attribute of the source material of author's VCR data, and selects the most suitable optical disc for its attribute from the various types of the optical discs. Then, the optical disc is made by performing the recording process of the VCR data.

By adopting such a method, the optical disc can be made efficiently and enormously in a short time as compared to a conventional disk making method that the scenario template is generated every time according to the attribute of the source material of the VCR data.

Next, a process of recording the source material of the author's VCR data on the aforementioned optical disc will be described. The recording process is performed by an encoding device, an reading device, and a recording device in the information generating apparatus of the embodiment. These devices are implemented by the execution of the substantive data generating program 23 installed in the hard disk 13 shown in FIG. 2, by the CPU 10.

It is assumed that the scenario template generated at the time of making each optical disc and the scenario template information are stored on the hard disk 13 in the information generating apparatus.

Figure 7:
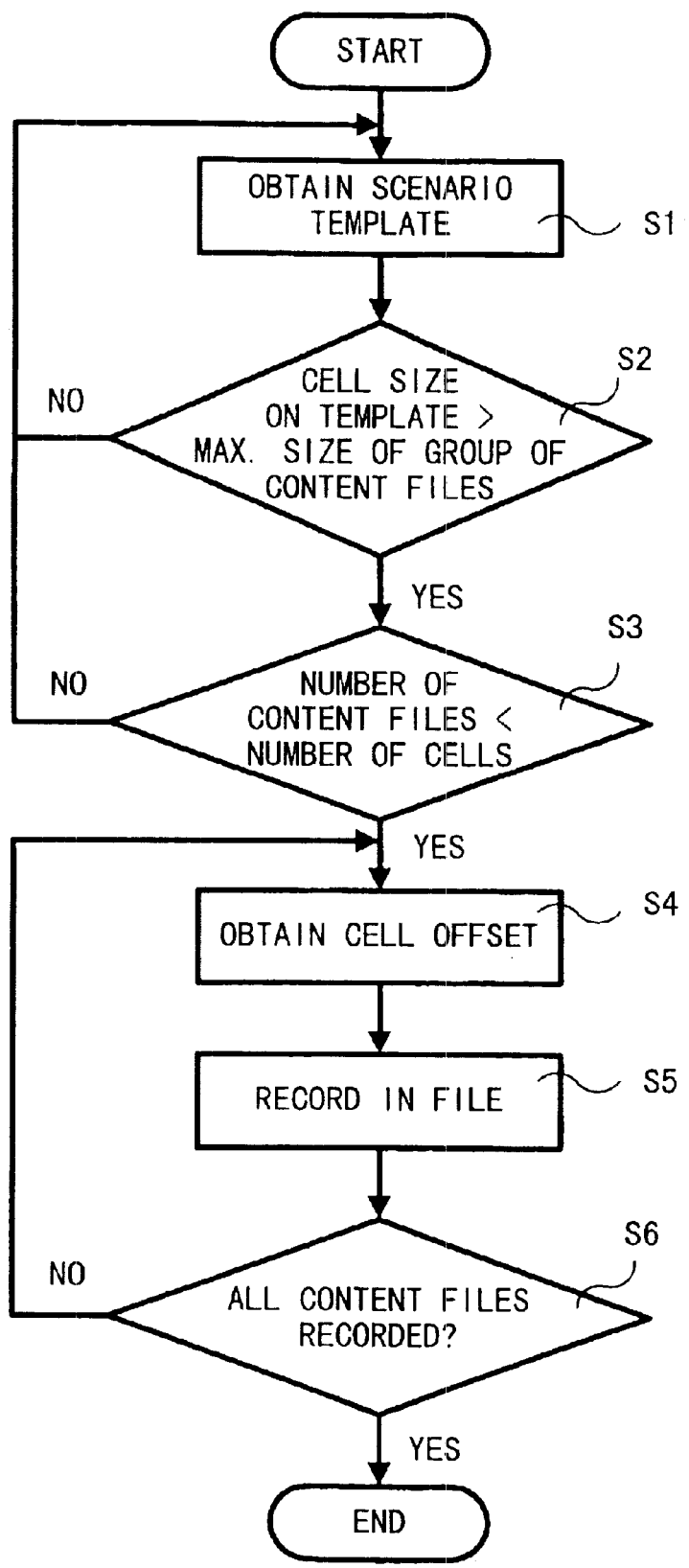
FIG. 7 is a flowchart of a process of information storing on the hard disk in the information generating apparatus in FIG. 1.

The recording process of the VCR data of the embodiment will be described with reference to a flowchart in FIG. 7.

First, as the substantive data generating program 23 is executed by the CPU 10, a prompt of the disk number is appeared on the display 2 of the information generating apparatus. Therefore, the operator selects the most suitable optical disc for the attribute of the author's VCR data and enters the disk number of the optical disc using the keyboard 3 or the mouse 4. By doing so, the CPU 10 obtains the scenario template information and the scenario template corresponding to the disk number (S1 (hereinafter, S stands for a step)).

Next, the CPU 10 prompts for information for the VCR data selection information list 409 and the VCR data start time information list 410, on the display 2. The operator enters the information using the keyboard 3 or the mouse 4 in response to the prompt while confirming the scenario template and a playback position of the videotape to be used.

Next, the CPU 10 outputs a control signal for performing a playback action according to the entered information, to VCR 5 via the serial interface 15. Thus, a video signal or an audio signal of a predetermined position and length is output from the VCR 5.

When a plurality of VCRs 5 are provided, before the aforementioned control signals is output, a control signal that selects the VCR 5 capable of playing the selected VCR data source is output to the VCR 5 via the serial interface 15. When one VCR 5 is provided, a confirmation whether a videotape is inserted into the VCR 5 may be performed via the serial interface 15 before the output of the control signal. The operator can be confirmed whether the videotape is recorded the selected VCR data source thereof by such displaying identification information of the videotape included in the VCR data selection information 409, on the display 2. Further, a barcode label, which shows the identification information, may be adhered to the videotape and is read by a barcode reader connected to the main unit 1.

Next, the CPU 10 inputs the video signal output from the VCR 5 to the MPEG2 encoder 16 having an I/O interface. Further, the CPU 10 inputs the audio signal output from the VCR 5 to the AC-3 encoder 17 having an I/O interface. Then, the CPU 10 reads the AV encoding method information list 412 and the AV bit rate list 413, and sets a criteria, which specifies the encoding method, and the bit rate of the encoding based on the information. Then, the CPU 10 executes the encoding under the condition.

Next, the CPU 10 arranges the encoded video or audio data at appropriate intervals so that the video and audio data can be synchronously played back, generates the system streams shown in FIG. 26, and temporary stores the system streams on the hard disk 13.

Then, the CPU 10 determines whether the size of the system stream (cell) exceeds the cell size, which is stored as the scenario template shown in FIG. 5 (S2). When it exceeds, a warning message that notify to use another optical disc is displayed on the display 2. When this massage is displayed, the operator selects the optical disc on which more larger cell size is allocated thereon and performs the process again from S1.

On the other hand, when the size of the system stream does not exceed the cell size which is stored as the scenario template, the CPU 10 increments the cell number and determines whether the incremented cell number exceeds the number of the cells which is stored as the scenario template (S3). When it does not exceed, the process is repeated with respect to the next cell, from S1.

After the system streams of all cells are generated, the CPU 10 reads the offset recorded in the area of the offset 811 to the cell data in the PGC information table for title 508 of the optical disc set in the optical disc recording apparatus 6, and records the system stream stored on the hard disk 13 in the recording area of the cell shown by the offset. At this time, the CPU 10 writes the cell playback time 810, the number of the logical blocks 812 occupied by the cell which is the data length on the system stream, and the direct access information table 805, as the PGC information of the video file management information (S5).

The processes from the obtainment of the offset to recording on the optical disc are repeated with respect to all cells (S6), then the recording process of the optical disc is completed.

Here, the recording process will be described using an example. In the example shown in FIG. 8A, the cells are recorded from a cell 1 in a numerical order. By doing so, even when the source materials of VCR data to be recorded in from a cell 3 can not be prepared at a first recording, they can be recorded at a second recording without making the optical disc again because the recording areas for the cells are allocated in the optical disc in the embodiment.

Figure 8A:
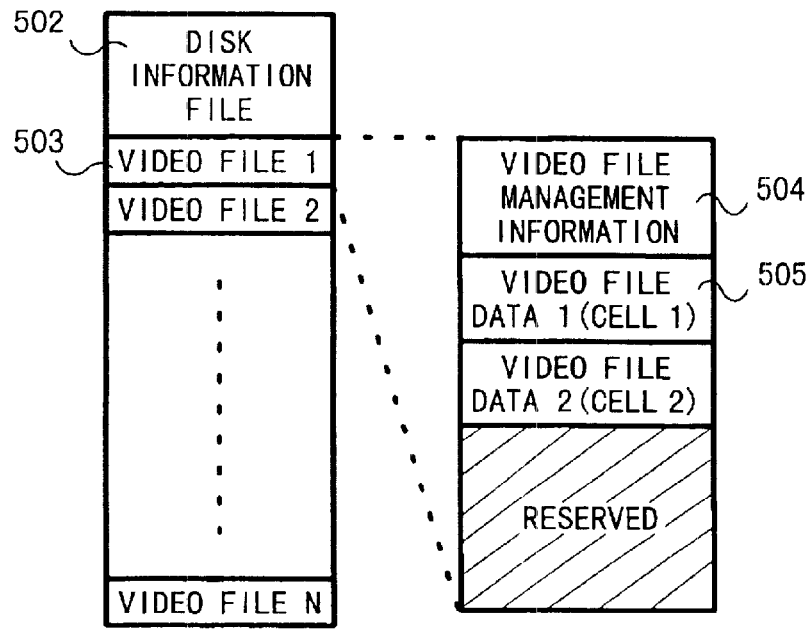
FIG. 8A is a diagram showing another example of a structure of information to be generated on a multimedia optical disc in the information generating apparatus of FIG. 1.
Figure 8B:
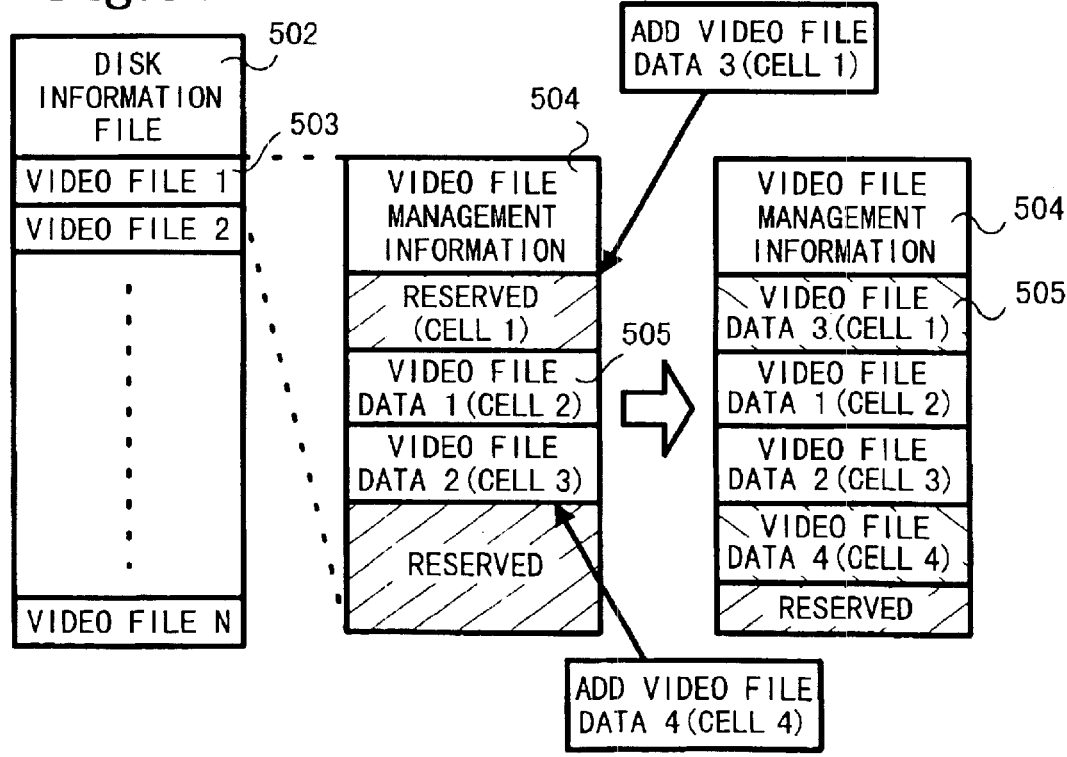
FIG. 8B is a diagram showing an example of a structure of information to be generated on a multimedia optical disc in the information generating apparatus of FIG. 1.

Further, for example, as shown in FIG. 8B, the cell 2 and the cell 3 are recorded at the first recording, and then the cell 1 and the cell 4 can be recorded at the second recording.

In any of these cases, the recording area for cells is allocated in the optical disc of the embodiment, so that the optical disc can be made without making it again even when all source materials of the VCR data are not prepared at a time.

Next, a second embodiment of the invention will be described. Elements that are common to the first and the second embodiments are given the same symbols and the explanations for those elements are omitted.

In this embodiment, a plurality of types of the optical discs are not made as the first embodiment. The disk images generated every optical discs are stored on the hard disk 13 and the disk image that is suit for the attribute of the author's VCR data is selected from the stored disk images. Then, the cell, the management information, and the like are written on the hard disk 13, similar to the first embodiment. After all writing is completed, recording is performed on a blank optical disc.

According to the second embodiment, in either case where an optical disc to be used is the DVD-R (DVD-Recordable) that can record information only once and can be appended information or the DVD-RW (DVD-Rewritable) that can be rewritten thousands of times, recording can be performed irrespective of the order of the cells. That is, when the all source materials of the VCR data is not prepared at a time, the cell is written on the disk image in any order. Then, after all writing is completed, the recording is performed on an optical disc.

Next, a third embodiment of the invention will be described with reference to FIGS. 9 to 11. Elements that are common to the first and the third embodiments are given the same symbols and the explanations for those elements are omitted.

In the third embodiment, not only cells, but also the menu information and the video file management information are recorded additional data thereon.

That is, in this embodiment, not only the recording area for cells in the video file data 505 but also the reserve recording areas for each or any of the title, the chapter, or the program are allocated in the menu information, the video file management information 504, and the video file data in the disk information file 502. Therefore, data can be added later.

Figure 9:
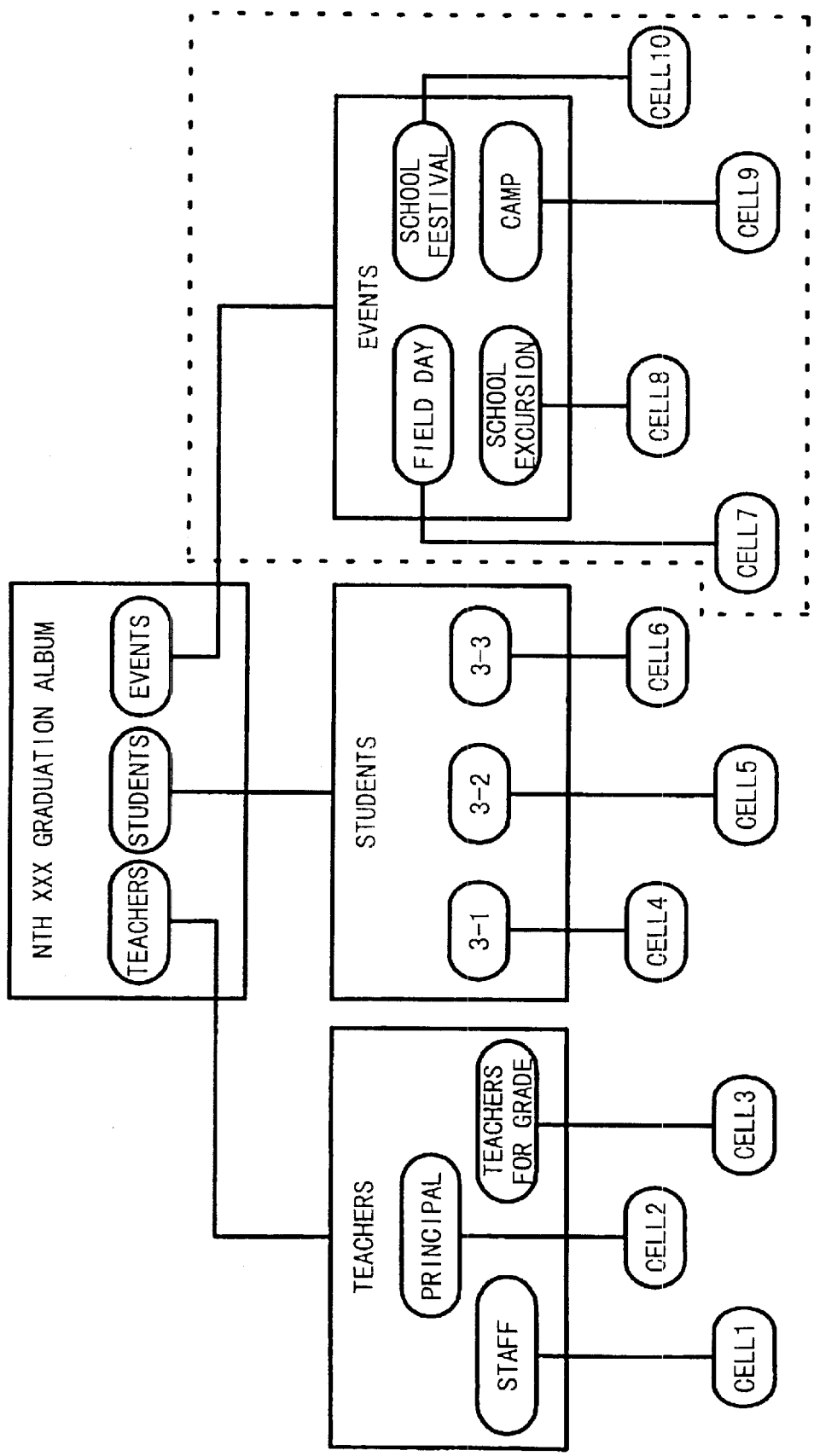
FIG. 9 is a diagram showing a scenario template in a third embodiment of the invention.

For example, as shown in FIG. 9, in the chapter named as "Events", the management information about the program enclosed with a dashed line is not recorded data thereon, however, the recording area for the data is allocated.

Figure 10A:
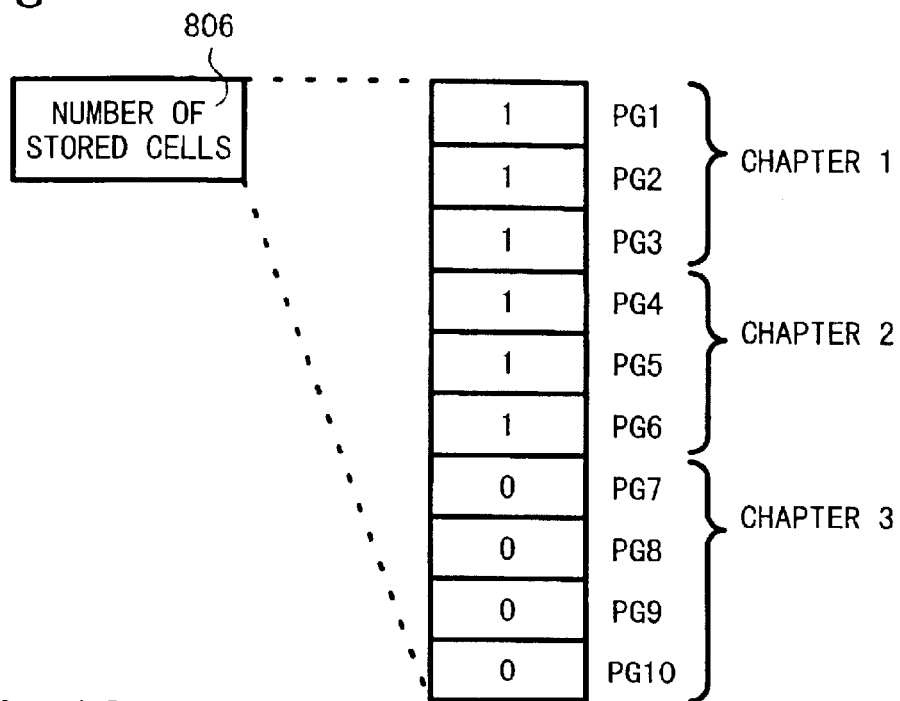
FIG. 10A is a diagram showing a content of information of stored cells included in management information to be generated in the third embodiment.
Figure 10B:
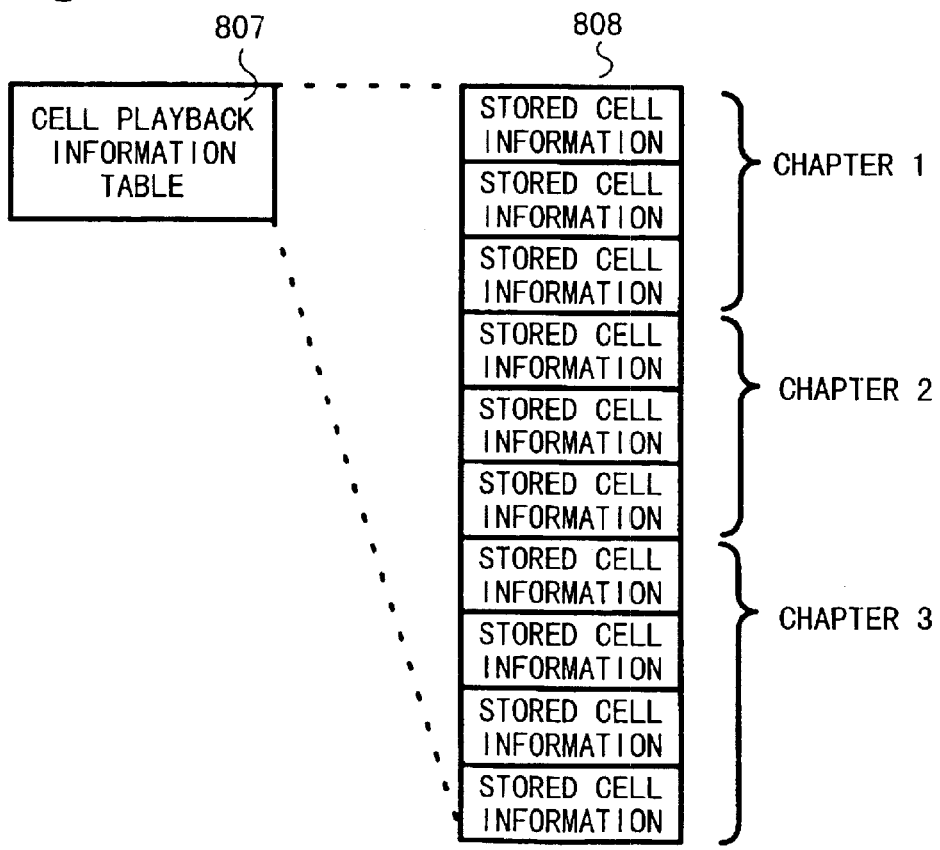
FIG. 10B is a diagram showing a content of a cell playback information table included in management information to be generated in the third embodiment.

As shown in FIG. 10A, in the area of the number of the stored cells 806 in the PGC information table for title 508, the information of the number of the cells that constructs each program is recorded. In the example shown in FIG. 9, the chapter named as "Teachers" is constructed of the programs named as "Staff", "Principal", and "Teachers for grade". The number of the cells for each program is 1, as shown in FIG. 10. Further, the number of the cells for each program named as "3-1", "3-2", and "3-3" in the chapter named as "Students" is also 1, as shown in FIG. 10A. However, the number of the cells for each program in the chapter named as "Events" is 0 though the recording area for four programs are allocated, as shown in FIG. 10A. Further, as shown in FIG. 10B, the information of the stored cells 808 in the cell playback information table 807 is recorded as the information for each cell, however, for the cells for the programs allocated the recording area thereof in the chapter named as "Events", only the recording areas are allocated and no contents are recorded.

Figure 11:
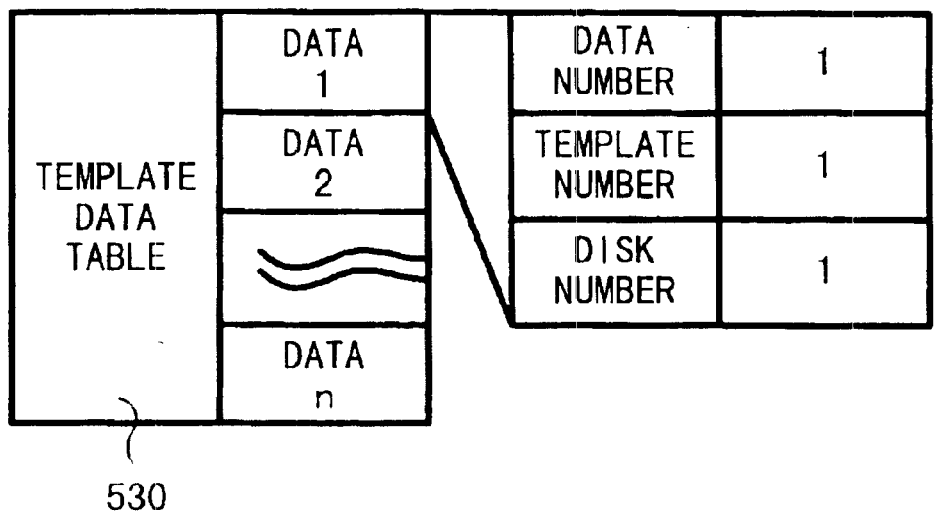
FIG. 11 is a diagram showing a structure of a template data table to be referred to in a process in the third embodiment of the invention.

When the VCR data is recorded in the chapter named as "Events" using the optical disc recorded the aforementioned information thereof, first, the scenario template used at the time of making the optical disc is read from the hard disk 13 using the template data table 530 shown in FIG. 11. That is, in this embodiment, as shown in FIG. 11, the scenario template number used at the time of making each optical disc and the disk numbers of each optical disc are stored in the template data table 530 formed on the hard disk 13. Then, as the operator enters the disk number of the optical disc to be recorded, the CPU 10 reads the scenario template number from the template data table 503 and then reads the scenario template of the number from the hard disk 13. Then, the CPU 10 displays the scenario template on the display 2.

From here on, as is the case with the first embodiment, the scenario template for the chapter named as "Events" is generated using a scenario generating program. However, when an operation such as adding the programs or the cells whose number exceeds the number of the allocated recording areas is performed, a warning massage should be displayed. Further, an operation such as making a change to the portion already generated should not be allowed.

As described above, as a new scenario template is generated, the CPU 10 reads the menu information and the video file management information 504 from the optical disc and expands the information on the hard disk 13. Then, the CPU 10 outputs the control signal to the VCR 5, inputs the VCR data, makes the MPEG2 encoder 16 encode and multiplex the video data, and stores on the hard disk 13, based on the entry of the operator.

The button display is also stored in the menu information on the hard disk 13 after the button display is generated to be suitable for the new scenario template.

As described above, the storing of the necessary information on the hard disk 13 is completed, the CPU 10 records the information on the optical disc via the optical disc recording apparatus 6.

As a result, the optical disc that additional data are recorded in not only cells, but also the menu information and the video file management information can be generated. Therefore, the optical disc that is adopted to operator demands can be made.

In this embodiment, the example that additional data is recorded in the program and the cell has been described. However, it would be understood that the invention is not restricted to the aforementioned structure. Additional data may be recorded in the title or the chapter.

In this embodiment, the example of making various types of optical discs on which the recording area is allocated in the video file management information in advance has been described. However, it would be understood that the invention is not restricted to the aforementioned structure. As the second embodiment, in the disk image stored on the hard disk 13, the recording area may be allocated in such as the video file management information in advance.

Next, a forth embodiment will be described with reference to FIGS. 12 to 15. Elements that are common to the first and the fourth embodiments are given the same symbols and the explanations for those elements are omitted.

In the aforementioned embodiments, the method that a plurality of types of the optical discs are made and the scenario template stored on the hard disk 13 is managed by the disk number, and the operator reads the disk number of the optical disc to be recorded and searches the scenario template on the hard disk 13 according to the disk number is used.

However, when the number of the scenario templates is enormous, much a time will be spent in the searching process if the aforementioned method is used. Further, when the correspondence of the optical disc and the disk number is confused due to any reason, it becomes difficult to perform the searching process.

Figure 12:
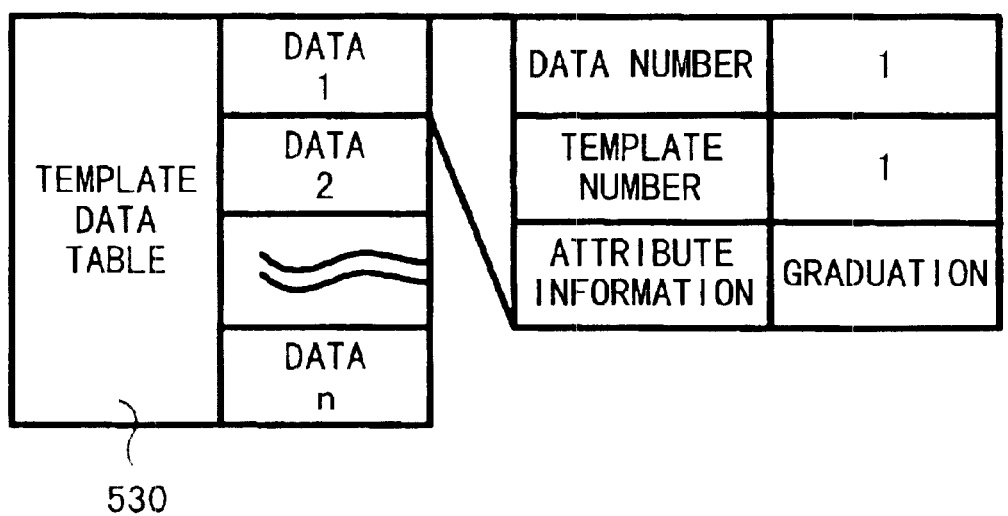
FIG. 12 is a diagram showing a structure of a template data table to be referred to in a process in a fourth embodiment of the invention.

Therefore, in this embodiment, the attribute is set each scenario template, and as shown in FIG. 12, in the template data table 530, the template number and the attribute information of each scenario template are paired and managed.

Figure 14:
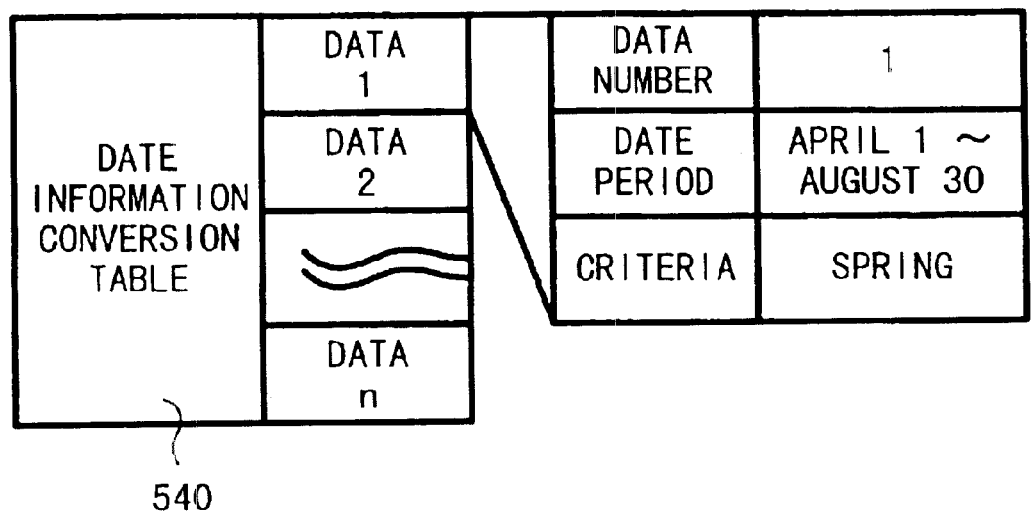
FIG. 14 is a diagram showing a structure of a date information conversion table to be referred to in a process in the fourth embodiment of the invention.

Further, as shown in FIG. 14, a date information conversion table 540 is provided on the hard disk 13. A plurality of data constructed of daily period information and criteria corresponding to the attribute is stored in the date information conversion table 540.

Then, a video tape, on which the VCR data to be recorded on an optical disc is recorded, is set and played in the VCR 5. The CPU 10 obtains a shooting date included in the played AV signals. Next, based on the shooting date, the CPU 10 searches the criteria from the date information conversion table 540. Further, the CPU 10 searches the scenario template having the attribute information that is most suitable for the criteria from the date information conversion table 530. An optical disc is made by recording the VCR data on the optical disc recorded the scenario template thereon.

Figure 15:
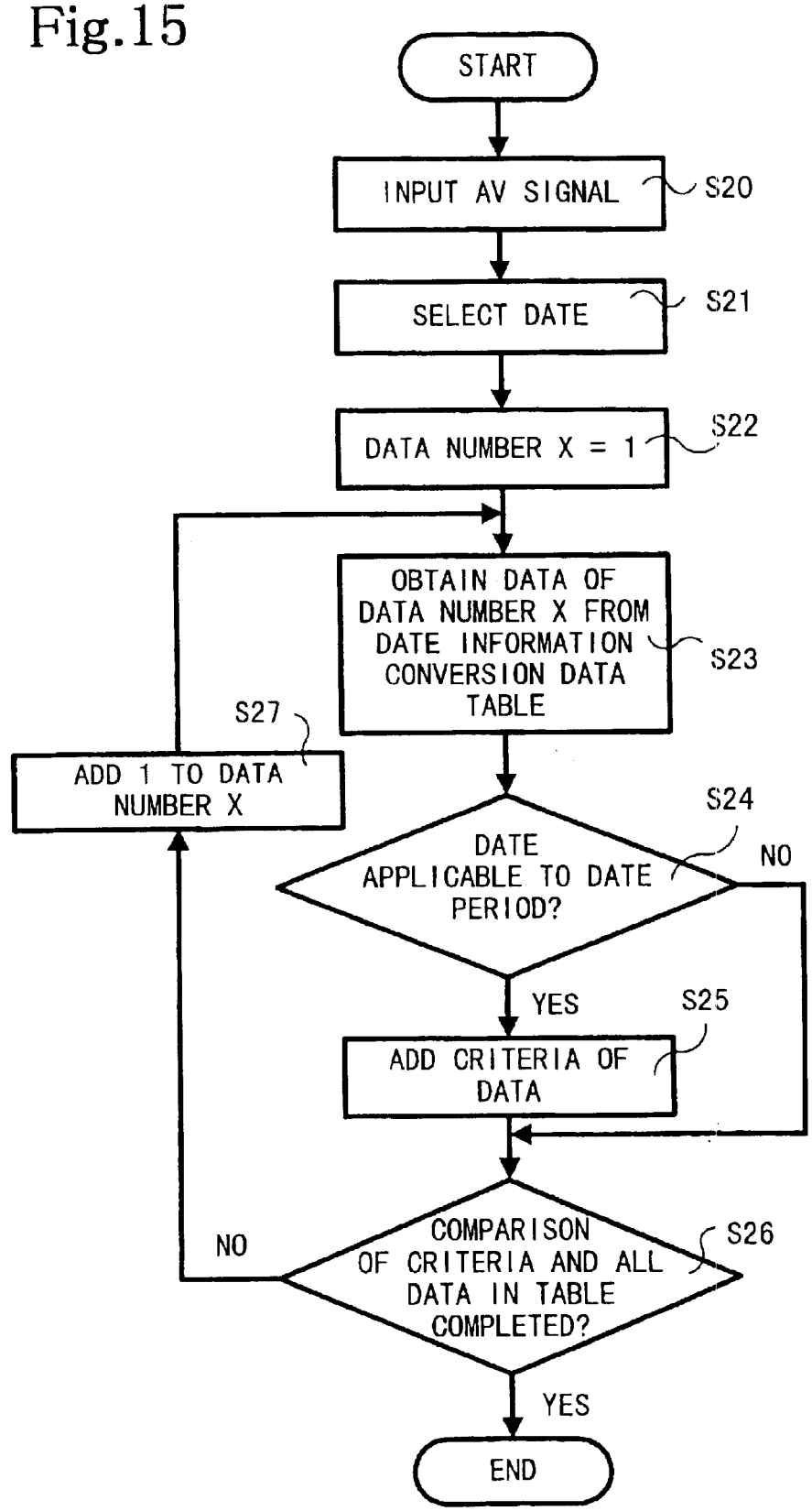
FIG. 15 is a flowchart showing a process of criteria search in the forth embodiment of the invention.

Hereinafter, a process of the obtainment of the scenario template of this embodiment will be described with reference to flowcharts in FIGS. 13 and 15.

First, the operator sets the video tape, on which the VCR data is recorded, in the VCR 5, and commands an initiation of the obtainment of the scenario template using the keyboard 3 or the mouse 4.

Therefore, the CPU 10 outputs the control signal to the VCR 5 and plays the video tape. Then, as shown in FIG. 15, the CPU 10 obtains the played AV signal (S20), and selects a shooting date information from the AV signal (S21).

Next, the CPU 10 sets the data number X in the date information conversion table 540 to 1 (S22). Then, the CPU 10 obtains the data whose data number is I from the date information conversion table 540 (S23).

Next, the CPU 10 reads the date period from the obtained data and determines whether the selected shooting date is applicable to the date period (S24).

When it is applicable, the CPU 10 reads the criteria of the obtained data and writes the criteria in a criteria table formed on the hard disk 13 or the RAM 12 (S25). Next, after the writing is completed or as a result of determination, when it is not applicable, the CPU 10 determines whether the search for all data in the date information conversion table 540 is completed (S26).

When it is not completed, the CPU 10 increments the data number X (S27), obtains the data whose data number is X from the date information conversion table 540, and repeats the comparison of the date information and the obtainment of the criteria (S23 to S25). When the search for all data in the date information conversion table 540 is completed, the process is completed.

As described above, the criteria suitable for the shooting date information of the optical disc can be obtained.

Figure 13:
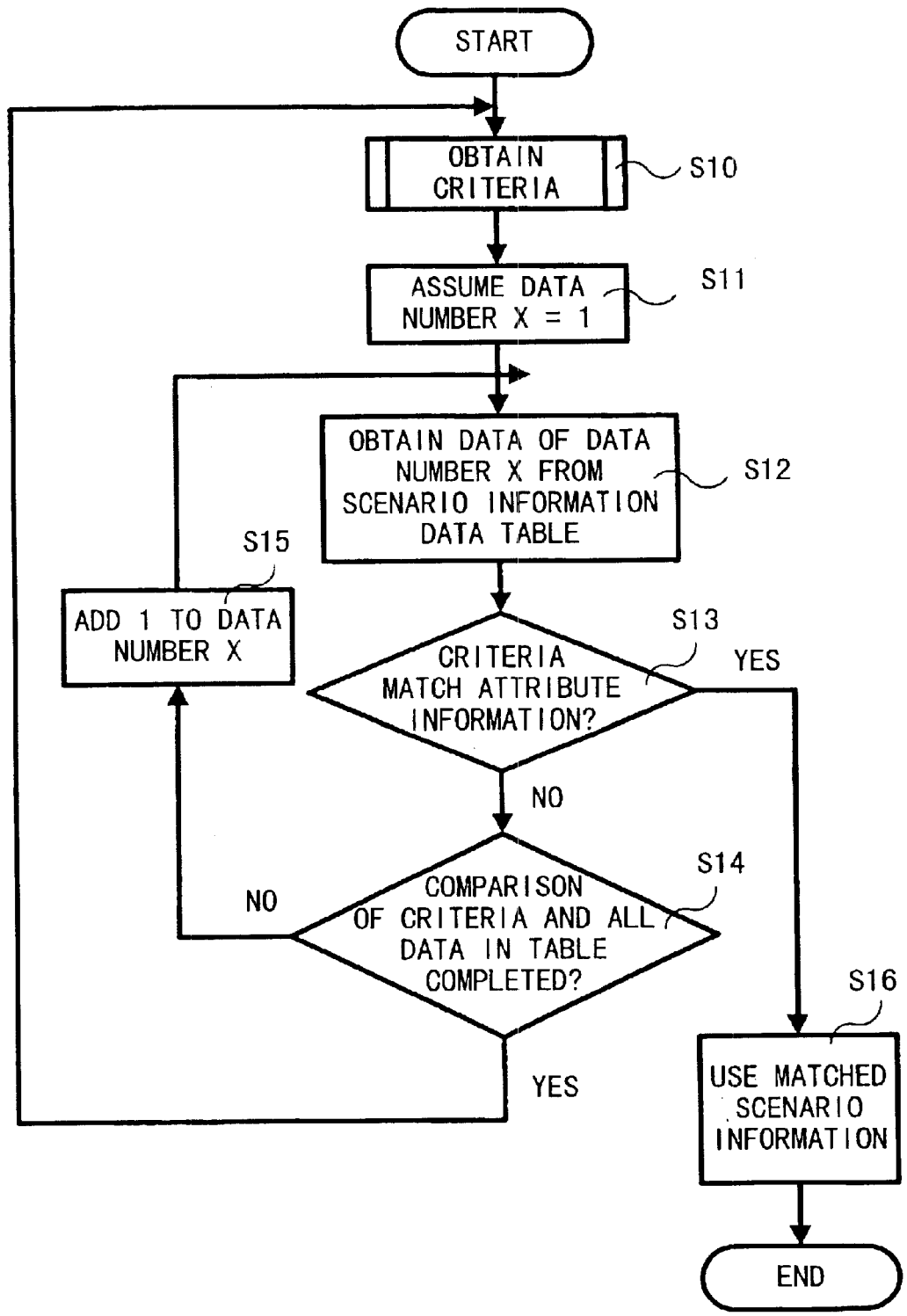
FIG. 13 is a flowchart showing an obtaining process of a scenario template in the fourth embodiment of the invention.

Next, as shown in FIG. 13, the CPU 10 obtains the criteria from the criteria table (S10), and sets the data number X in the template data table 530 to 1 (S11).

Then, the CPU 10 obtains the data whose data number is 1 from the template data table 530 (S12), and compares the input data to the attribute information of the obtained data (S13).

As a result, when the criteria is not applicable to the attribute information, the CPU 10 determines whether the comparison of all data in the template table 530 is completed (S14). When the comparison is not completed, the CPU 10 increments the data number X (S15) and repeats the obtainment of data and the comparison (S12 to S14).

When the comparison of the all data in the template data table 530 is completed, the CPU 10 obtains the next criteria from the criteria table (S10), and repeats each aforementioned process (S11 to S14).

As a result of performing the aforementioned process, when there is attribute information corresponding to the criteria, the CPU 10 reads the template number of the corresponded data, obtains the scenario template of the template number, and uses the scenario template at the time of recording (S16).

As described above, according to this embodiment, even when the number of the scenario template is enormous, the scenario template suitable for the VCR data, which is commanded to make an optical disc, can be speedily searched, so that the optical disc can be efficiently made.

As an example of products that can record the shooting date in the AV signal of the video tape in this embodiment, there are a digital video camera and a digital video tape on which VCR data is recorded using the digital video camera. If the digital video tape is used, it is possible to achieve the embodiment.

Figure 16:
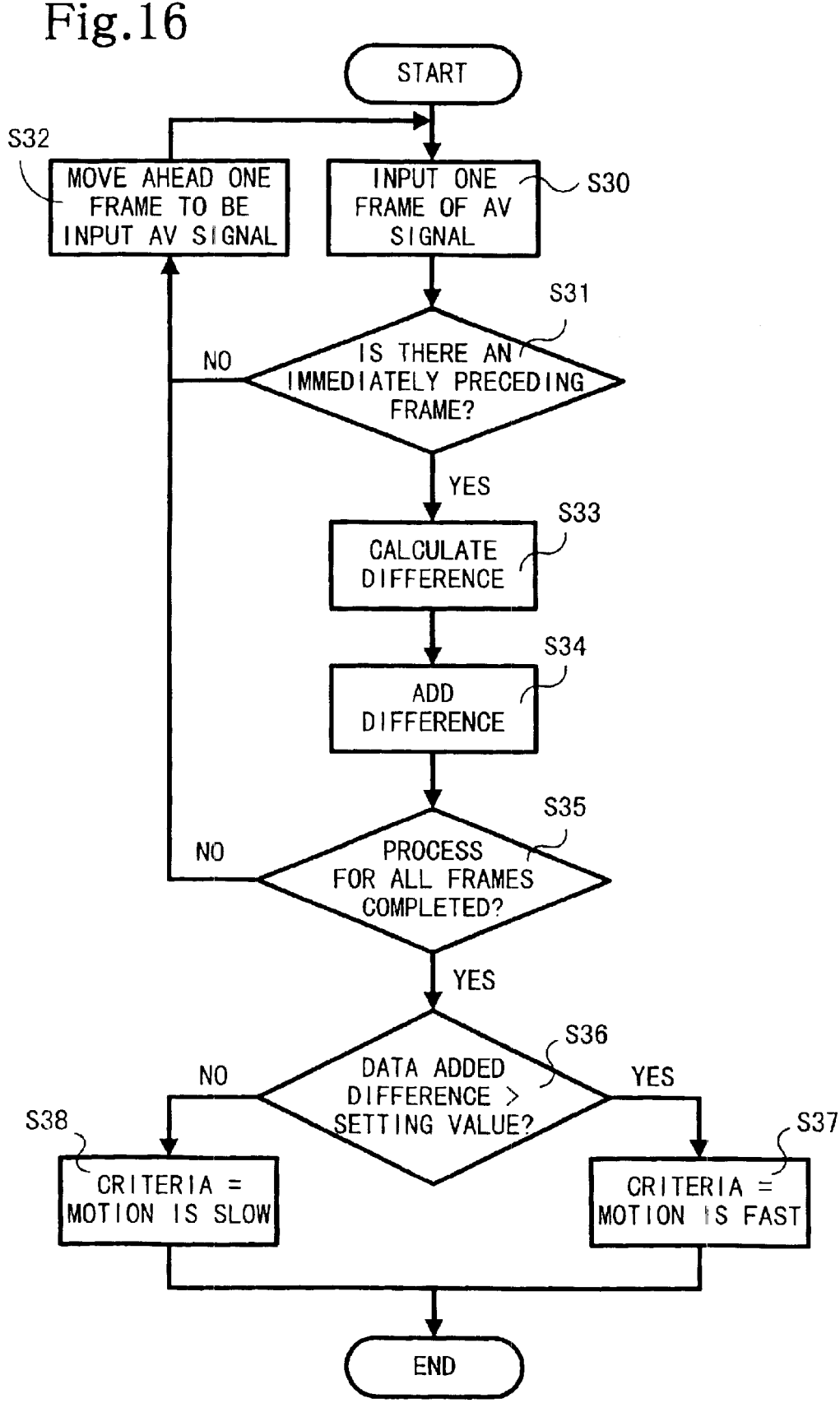
FIG. 16 is a flowchart showing a process of criteria search in a fifth embodiment of the invention.

Next, a fifth embodiment of the invention will be described with reference to FIG. 16. Elements that are common to the aforementioned embodiments and the fifth embodiment are given the same symbols and the explanations for those elements are omitted.

In the forth embodiment, the example that the shooting date information is selected from the AV data and the criteria for searching the attribute information is selected based on the shooting date information has been described. However, an example that the criteria is selected based on a difference of the AV data will be described in this embodiment. Hereinafter, a process of criteria selection will be described with reference to a flowchart in FIG. 16.

First, the CPU 10 inputs a frame of the AV data (S30), and then determines whether there is an immediately preceding frame (S31). As a result of this, when there is no preceding frame, the CPU 10 moves ahead the frame of the input AV frame (S32), and inputs a frame of the AV data again (S30).

Next, the CPU 10 calculates difference of brightness and color-difference between the immediately preceding frame signal and the current input frame signal (S33).

Then, the obtained difference is added (S34).

Next, the CPU 10 determines whether the predetermined setting number of frames of the process is completed (S35). When it is not completed, the CPU 10 moves ahead one frame to be input the AV signal (S32), and repeats the aforementioned process (S30 to S35).

When the predetermined setting number of frames of the process is completed, the CPU 10 compares the value of the result of the addition with a predetermined value (S36). When the value of the result of the addition is greater than the predetermined value, the criteria is determined as "motion is fast" (S37). When the value of the result of the addition is smaller than the predetermined value, the criteria is determined as "motion is slow" (S38).

Based on the criteria obtained as described above, the CPU 10 searches the scenario template following to steps of a flowchart in FIG. 13.

According to this embodiment, the search of the scenario template can be speedily performed without providing a criteria search table shown as FIG. 14.

Figure 17:
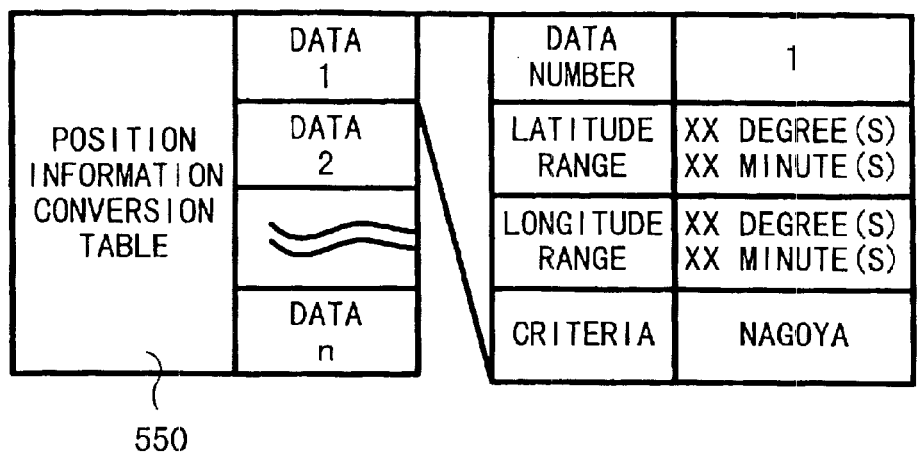
FIG. 17 is a diagram showing a structure of a location information conversion table to be referred to in a process in a sixth embodiment.
Figure 18:
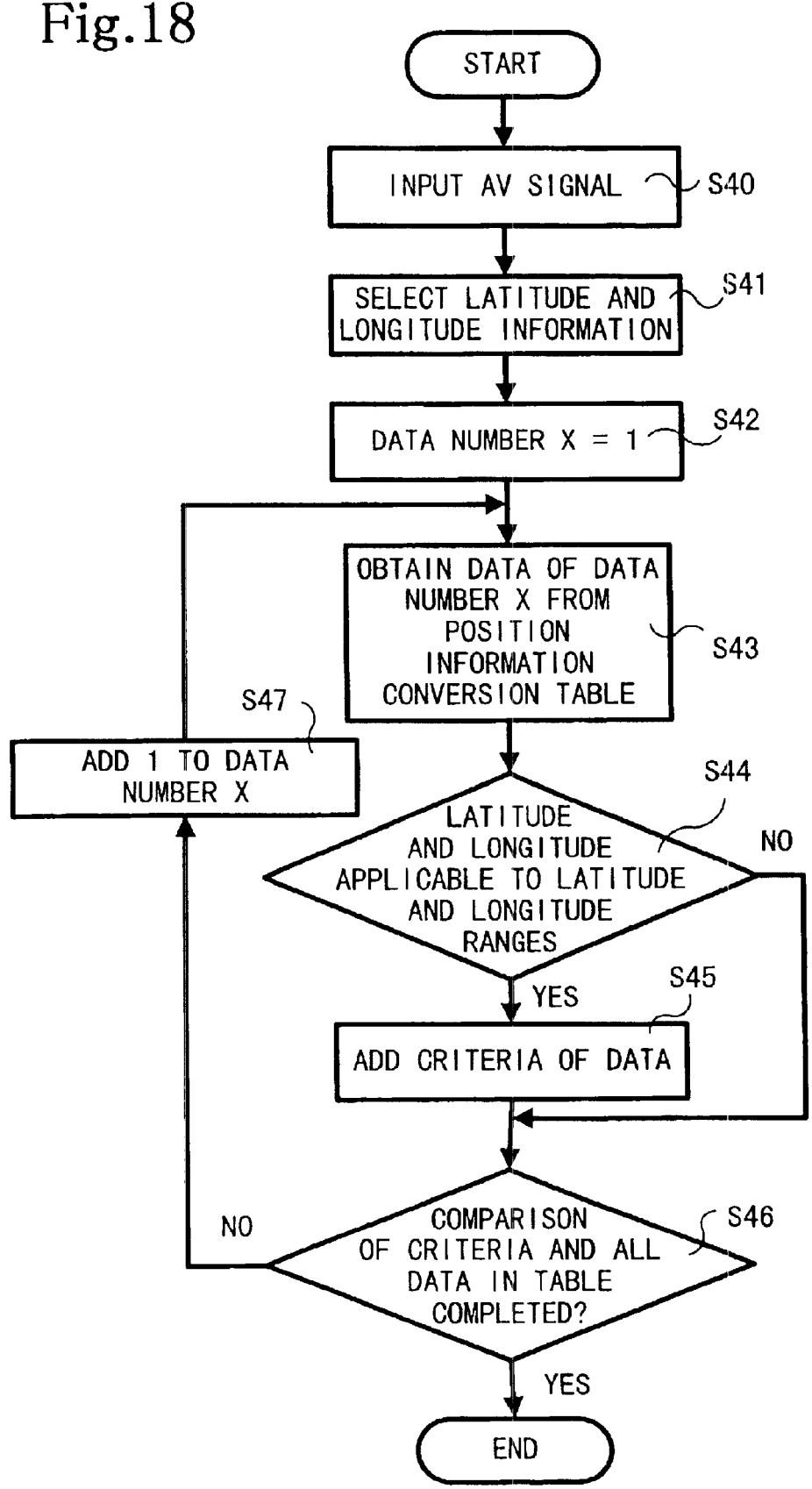
FIG. 18 is a flowchart showing a process of criteria search in the sixth embodiment of the invention.

Next, a sixth embodiment of the invention will be described with reference to FIGS. 17 and 18. Elements that are common to the aforementioned embodiments and the sixth embodiment are given the same symbols and the explanations for those elements are omitted.

In the fourth embodiment, the example that the shooting date information is selected from the AV data and the criteria for searching the attribute information is selected based on the shooting date information has been described. However, in this embodiment, an example that the criteria is selected based on a latitude information and a longitude information included in the AV data. When a video camera obtains the latitude and longitude information from an artificial satellite and those information is recorded on the video camera, the embodiment can be structured as described below. That is, in this embodiment, as shown in FIG. 17, a position information conversion table 550 is generated in advance by bringing the lateral information into correspondence with the longitude information, and the criteria is selected from the position information conversion table 550 based on the lateral and longitude information. Hereinafter, a process of criteria selection of the embodiment will be described with reference to a flowchart in FIG. 18.

First, the operator sets the video tape, on which the VCR data is recorded, in the VCR 5, and commands an initiation of the obtainment of the scenario template using the keyboard 3 or the mouse 4.

Therefore, the CPU 10 outputs the control signal to the VCR 5 and plays the video tape. Then, as shown in FIG. 15, the CPU 10 obtains the played AV signal (S40), and selects the latitude and longitude information of the shooting location from the AV signal (S41).

Next, the CPU 10 sets the data number X in the position information conversion table 550 to 1 (S42), and obtains the data whose data number is X from the position information conversion table 550 (S43).

Then, the CPU 10 reads the obtained latitude and longitude range, and determines whether the selected latitude and longitude information is applicable to the range (S44).

When it is applicable, the CPU 10 reads the criteria of the obtained data, and writes the criteria in the criteria table formed on hard disk 13 or the RAM 12 (S45). When it is not applicable after the writing is completed or as a result of the determination, the CPU 10 determines whether the search for all data in the position information conversion table 550 is completed (S46).

When it is not completed, the CPU 10 increments the date number (S47), obtains the data whose data number is X from the position information conversion table 550, and repeats the comparison of the position information and the obtainment of the criteria (S43 to S45). When the search for all data in the location information conversion table 550 is completed, the process is completed.

As described above, the criteria suitable for the latitude and longitude information of the optical disc can be obtained.

Next, the CPU 10 obtains the criteria from the criteria table. Then, the CPU 10 searches the scenario template and records the information using the scenario template by performing the process shown in FIG. 13.

As described above, according to this embodiment, even when the number of the scenario templates is enormous, the scenario template suitable for the VCR data, which is commanded to make an optical disc, can be speedily searched, so that the optical disc can be efficiently made.

As an example of products that can record the shooting data in the AV signal of the video tape in this embodiment, there is a video camera equipped with a GPS (Global Positioning System). If the video tape on which the VCR data is recorded using the video camera is used, it is possible to achieve the embodiment.

Next, a seventh embodiment of the invention will be described with reference to FIGS. 19 and 20. Elements that are common to the aforementioned embodiments and the seventh embodiment are given the same symbols and the explanations for those elements are omitted.

Figure 19:
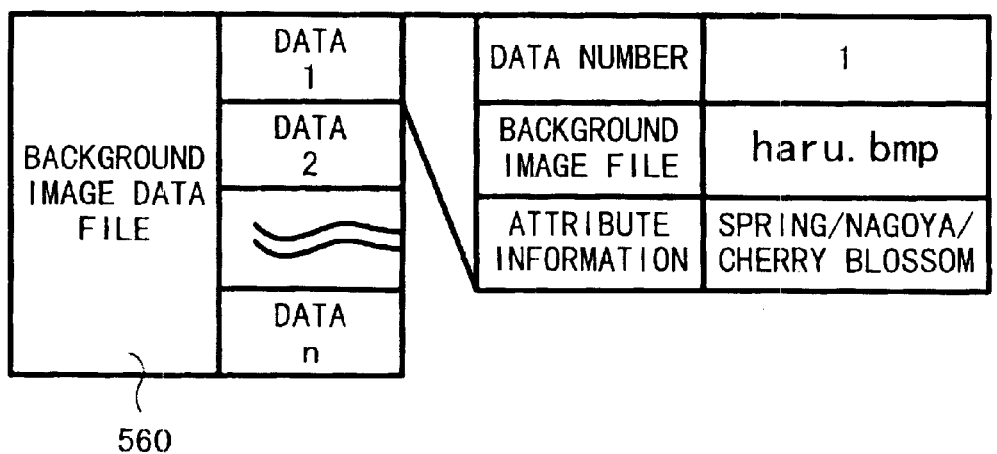
FIG. 19 is a diagram showing a structure of a background image data table to be referred to in a process in a seventh embodiment.
Figure 20:
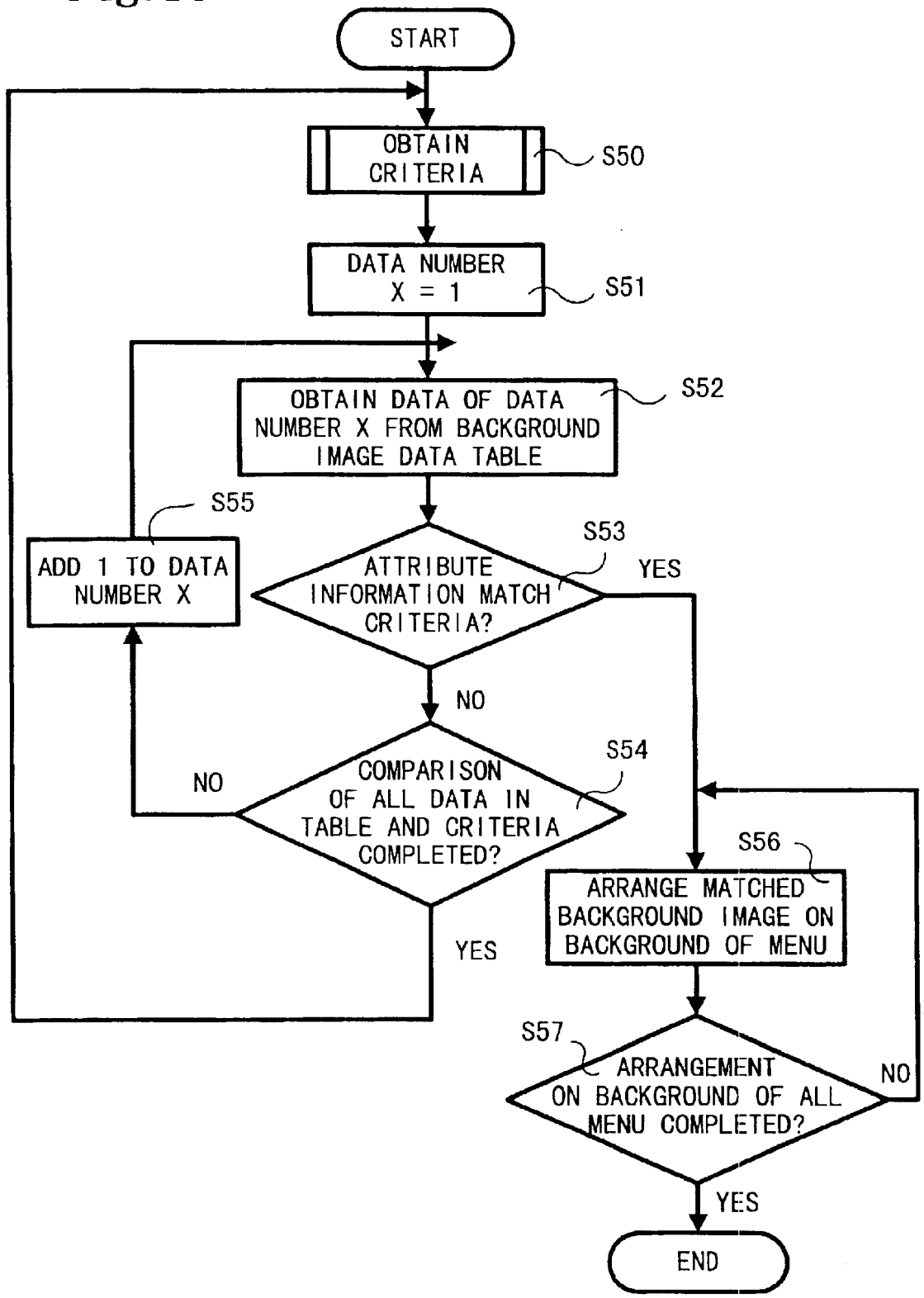
FIG. 20 is a flowchart showing an obtaining process of a background image in the sixth embodiment of the invention.

In this embodiment, in a display image of the scenario template, a plurality of types of the background images to be the background of the button image is stored on the hard disk 13 and a background image data table 560 that the background image and the attribute information are corresponded with as shown in FIG. 19 is generated on the hard disk 13. Then, the various criteria are selected and the background image having the attribute information corresponding to the criteria by the method described in FIGS. 14 and 15, or 16, or 17 and 18. Hereinafter, a searching process of the background image of this embodiment will be described with reference to FIG. 20. However, the criteria selection method described using FIGS. 14 and 15, or 16, or 17 and 18, has been described before, so that explanation for them is omitted.

First, the operator sets the video data, on which the video data is recorded, in the VCR 5, and selects the scenario template by any method described above. Then, the operator commands an initiation of search for the background image of the embodiment using the keyboard 3 or the mouse 4.

Therefore, the CPU 10 obtains the criteria from the criteria table generated at the time of performing any criteria selection method described using FIGS. 14 and 15, or 16, or 17 and 18 (S50). Then, the CPU 10 sets the data number X in the background image data table 560 to 1 (S51).

Then, the CPU 10 obtains the data whose data number is X from the background image data table 560 (S52) and compares the input criteria with the attribute information of the obtained data (S53).

As a result, when the criteria is not applicable to the attribute information, the CPU 10 determines whether the comparison of all data in the background image data table 560 (S54). When the comparison is not completed, the CPU 10 increments the data number X (S55) and repeats the obtainment of data and the comparison (S52 to S54).

When the comparison of all data in the background image data table 560 is completed, the CPU 10 obtains the next criteria from the criteria table (S50) and repeats the aforementioned process (S51 to S54).

After performing the aforementioned process, when there is an attribute information corresponding to the criteria, the CPU 10 reads the file name corresponding to the criteria of the attribute information and arranges the background image of the file name as a background image of the scenario template (S56). Then, the CPU 10 determines whether the all background images are arranged on the background of the all button images of the scenario templates (S57). When the arrangement is not completed, the CPU 10 repeats the arrangement (S56), and completes the whole process after the completion of the arrangement.

As described above, according to this embodiment, even when the number of the background images and the scenario templates are enormous, the background image suitable for the video data, which is commanded to make an optical disc, and the scenario template can be speedily searched, so that the optical disc can be efficiently made.

In the obtainment of the scenario template or the background image, a personal information on the VCR data prepared by author may be entered using the keyboard 3 or the mouse 4 and it may be used as the criteria.

It would be understood that the invention is not restricted to the DVD. However, the invention can be applied to multimedia optical discs of every description. Further, the invention can be applied to not only an authoring apparatus, but also a multimedia optical disc recording-playback apparatus intended for the home, for example.

What is claimed is:

1. A rewritable information recording medium having a logical structure to manage encoded substantive data representing one of video data or audio data per title, comprising:

a first recording area which is allocated for recording the substantive data and substantive data management information for managing the recording area and the substantive data, and menu management information for managing the substantive data management information; and a predetermined number of secondary recording areas having a predetermined size per cell, wherein the menu management information contains information for managing the substantive data management information for a predetermined number of titles, the substantive data management information contains information for the predetermined number of titles, and the substantive data management information for each title contains information for managing the predetermined number of recording areas per cell.

2. The information recording medium according to claim 1, wherein the menu management information and the substantive data management information are prerecorded selection information for selecting the title or the cell under the title thereon regardless of whether the substantive data is recorded in the recording area.

3. A method for generating information to structure the information recording medium of claim 1, by storing and allocating information to the recording areas on a storage device other than the information recording medium, the method comprising the steps of:

inputting scenario information for managing the substantive data management information per title and information concerning the size and the number of the substantive data recording areas of which are managed per cell;

allocating a menu management information recording area on the storage device for recording menu management information for managing the substantive data management information based on the number of the titles included in structure information of the title in the scenario information;

allocating a substantive data management information recording area on the storage device for managing the substantive data recording area based on the number of cells of the information included in the structure information of the title;

allocating a substantive data recording area on the storage device, based on the size and the amount of substantive data and the number of cells;

recording information for managing the substantive data management information in the menu management information recording area, after allocating the substantive data management information recording area; and recording information for managing the substantive data recording area in the substantive data management information recording area, after allocating the substantive data recording area.

4. The method for generating information to structure the information recording medium of claim 3, wherein the information for managing the substantive data management information or the information for managing the substantive data recording area contains selection information for selecting the title or the cell under the title.

5. The method for structuring the information recording medium of claim 4, further comprising the steps of:

outputting the information generated on the storage device;

converting the output information to a predetermined recording format; and recording the information on the information recording medium by modulating a light beam based on the converted information.

6. The method for structuring the information recording medium of claim 3, further comprising the steps of:

outputting the information generated on the storage device;

converting the output information to a predetermined recording format; and recording the information on the information recording medium by modulating a light beam based on the converted information.

7. An information generating apparatus having a storage device for structuring the information recording medium of claim 1, by storing and allocating information and the recording areas on the storage device other than the information recording medium, comprising:

an information input device that inputs scenario information for managing the substantive data management information per title and information of the size and the number of substantive data recording areas which are managed per cell;

a recording area allocating device that allocates recording areas on each storage device, the recording areas including a menu management information recording area for recording menu management information for managing the substantive data management information based on structure information of the title in the scenario information included in the number of the titles, a substantive data management information recording area for recording substantive data management information for managing the substantive data recording area based on the number of the cells included in the structure information of the title, and a substantive data recording area for recording the substantive data based on the size and the number of substantive data recording areas and the number of the cells;

an information recording device that records information for managing the substantive data management information in the menu management information recording area after allocating the substantive data management information recording area, and records information for managing the substantive data recording area in the substantive data management information recording area after allocating the substantive data recording area.

8. The information generating apparatus for making the information recording medium of claim 7, wherein the information for managing the substantive data management information or the information for managing the substantive data recording area contains selection information for selecting the title or the cell under the title.

9. The apparatus for making the information recording medium of claim 8, further comprising:

an information output device that outputs the information generated on the storage device;

a conversion device that converts the output information to a predetermined recording format; and a recording device that records the information on the information recording medium by modulating a light beam based on the converted information.

10. The apparatus for making the information recording medium of claim 7, further comprising:

an information output device that outputs the information generated on the storage device;

a conversion device that converts the output information to a predetermined recording format; and a recording device that records the information on the information recording medium by modulating a light beam based on the converted information.

11. A computer readable information recording medium storing a program for generating information to structure the information recording medium of claim 1 by allowing a computer to execute the steps of storing and allocating information and the recording areas on a storage device of the computer, the program comprising:

a program for inputting scenario information for managing the substantive data management information per title and information concerning the size and the number of the substantive data recording areas which are managed per cell;

a program for allocating a menu management information recording area on the storage device for recording menu management information for managing the substantive data management information based on the number of the titles included in structure information of the title in the scenario information;

a program for allocating a substantive data management information recording area on the storage device for recording substantive data management information for managing the substantive data recording areas, based on the number of the cells of the information included in the structure information of the title;

a program for allocating a substantive data recording area for recording the substantive data based on the size and the number of the substantive data and the number of the cells;

a program for recording the information for managing the substantive data management information in the menu management information recording area after allocating the substantive data management information recording area;

a program for recording the information for managing the substantive data recording areas in the substantive data management information recording area after allocating the substantive data recording area.

12. The computer readable information recording medium according to claim 11, wherein the information for managing the substantive data management information or the information for managing the substantive data recording areas contains selection information for selecting the title or the cell under the title.

13. The computer readable information recording medium storing programs thereon for structuring the information recording medium of claim 12, further comprising:

a program for outputting the information generated on the storage device;

a program for converting the output information to a predetermined recording format; and a program for recording the information on the information recording medium by modulating a light beam based on the converted information.

14. The computer readable information recording medium storing programs thereon for structuring the information recording medium of claim 11, the further comprising:
a program for outputting the information generated on the storage device;
a program for converting the output information to a predetermined recording format; and
a program for recording the information on the information recording medium by modulating a light beam based on the converted information.

15. A method for structuring an information recording medium recording video data or audio data thereon using the information recording medium of claim 1, the method comprising the steps of:
preparing a plurality of kinds of information recording mediums having the logical structure, each kind of information recording medium-being different in at least one of the number of the information, which any one of the number of the titles, the number of the cells per title, the number of hierarchies of the cell, and a pattern of the hierarchy;
selecting one information recording medium having a logical structure which is suitable for a correlation among a plurality of the substantive data to be recorded from the various types of the information recording mediums;
encoding the substantive data to be recorded;
reading contents of the menu management information and substantive data management information from the selected information making medium; and
recording the encoded substantive data in a substantive data recording area based on the read contents.

16. A method for making an information recording medium by recording new substantive data on the information recording medium of claim 1, the method comprising the steps of:
encoding the substantive data to be recorded;
reading contents of the menu management information and the substantive data management information from the information recording medium, which is recorded the video or audio data thereon;
recording the encoded substantive data in a substantive data recording area based on the read contents.

17. An apparatus for making an information recording medium by recording new substantive data on the information recording medium of claim 1, comprising:
an encoding device that encodes the substantive data to be recorded;
a reading device that reads contents of the menu management information and the substantive data management information from the information recording medium, which is recorded the video or audio data thereon; and
a recording device that records the encoded substantive data in a substantive data recording area based on the read contents.

18. A computer readable information recording medium storing a program thereon for making an information recording medium to record new video data or audio data on the information recording medium according to claim 1, the program comprising:
a program for encoding the substantive data to be recorded;
a program for reading contents of the menu management information and the substantive data management information from the information recording medium;
a program for recording the encoded substantive data in a substantive data recording area based on the read contents.

19. A method for generating information to structure an information recording medium, by storing and allocating information to recording areas on a storage device other than the information recording medium, the method comprising the steps of:
inputting scenario information for managing substantive data management information per title and information concerning the size and the number of substantive data recording areas of which are managed per cell;
allocating a menu management information recording area on the storage device for recording menu management information for managing the substantive data management information based on the number of the titles included in structure information of the title in the scenario information;
allocating a substantive data management information recording area on the storage device for managing the substantive data recording area based on the number of cells of the information included in the structure information of the title;
allocating a substantive data recording area on the storage device, based on the size and the amount of substantive data and the number of cells;
recording information for managing the substantive data management information in the menu management information recording area, after allocating the substantive data management information recording area; and
recording information for managing the substantive data recording area in the substantive data management information recording area, after allocating the substantive data recording area.

20. A computer readable information recording medium storing a program for generating information to structure an information recording medium by allowing a computer to execute the steps of storing and allocating information and recording areas on a storage device of the computer, the program comprising:
a program for inputting scenario information for managing substantive data management information per title and information concerning the size and the number of substantive data recording areas which are managed per cell;
a program for allocating a menu management information recording area on the storage device for recording menu management information for managing the substantive data management information based on the number of the titles included in structure information of the title in the scenario information;
a program for allocating a substantive data management information recording area on the storage device for recording substantive data management information for managing the substantive data recording areas, based on the number of the cells of the information included in the structure information of the title;
a program for allocating a substantive data recording area for recording the substantive data based on the size and the number of the substantive data and the number of the cells;
a program for recording the information for managing the substantive data management information in the menu management information recording area after allocating the substantive data management information recording area;
a program for recording the information for managing the substantive data recording areas in the substantive data management information recording area after allocating the substantive data recording area.

* * * * *